United States Patent
Takeuchi et al.

(10) Patent No.: US 8,072,166 B2
(45) Date of Patent: Dec. 6, 2011

(54) BRUSHLESS MOTOR

(75) Inventors: Kesatoshi Takeuchi, Shioziri (JP); Mamoru Sugimoto, Chino (JP); Isamu Sejimo, Matsumoto (JP); Kazuyoshi Nakamura, Azumino (JP)

(73) Assignee: Seiko Epson Corporation (JP)

( * ) Notice: Subject to any disclaimer, the term of this patent is extended or adjusted under 35 U.S.C. 154(b) by 452 days.

(21) Appl. No.: 12/079,135

(22) Filed: Mar. 25, 2008

(65) Prior Publication Data

US 2008/0246424 A1 Oct. 9, 2008

(30) Foreign Application Priority Data

Apr. 9, 2007 (JP) .................................. 2007-101599
Jan. 8, 2008 (JP) .................................. 2008-001585

(51) Int. Cl.
*H02P 1/04* (2006.01)

(52) U.S. Cl. ............ 318/400.17; 318/400.04; 318/400.3; 310/179; 310/180; 310/186

(58) Field of Classification Search .................. 310/179, 310/180, 186; 318/400.04, 400.17, 400.3
See application file for complete search history.

(56) References Cited

U.S. PATENT DOCUMENTS

| | | | | |
|---|---|---|---|---|
| 3,601,640 A * | 8/1971 | Egawa | ........................ | 310/49.34 |
| 3,751,696 A * | 8/1973 | Morreale | .................... | 310/49.32 |
| 4,638,195 A * | 1/1987 | Lin | ............................. | 310/49.33 |
| 4,739,203 A * | 4/1988 | Miyao et al. | ................. | 310/67 R |
| 4,874,975 A * | 10/1989 | Hertrich | ......................... | 310/186 |
| 4,933,584 A * | 6/1990 | Harms et al. | ................... | 310/162 |
| 4,983,867 A * | 1/1991 | Sakamoto | .................... | 310/49.37 |
| 5,637,974 A * | 6/1997 | McCann | ........................ | 318/701 |
| 5,820,349 A * | 10/1998 | Caillat | ........................ | 417/44.11 |
| 5,909,072 A * | 6/1999 | Muller | .......................... | 310/68 B |
| 6,225,722 B1 * | 5/2001 | Rupp et al. | ...................... | 310/91 |
| 6,384,505 B1 * | 5/2002 | Horng et al. | ................... | 310/186 |
| 7,466,092 B2 * | 12/2008 | Prudham | ................... | 318/400.01 |
| 2005/0001580 A1 * | 1/2005 | Dorner | .......................... | 318/653 |
| 2005/0031322 A1 * | 2/2005 | Boyle et al. | .................... | 388/800 |
| 2005/0121989 A1 * | 6/2005 | Suzuki | ..................... | 310/156.06 |
| 2006/0119300 A1 * | 6/2006 | Armstrong | ..................... | 318/254 |
| 2006/0244333 A1 * | 11/2006 | Jeung | ............................ | 310/186 |
| 2007/0236099 A1 * | 10/2007 | Kim et al. | ..................... | 310/266 |

FOREIGN PATENT DOCUMENTS

| | | | |
|---|---|---|---|
| JP | 11055918 A | * | 2/1999 |
| JP | 2001-298982 | | 10/2001 |

OTHER PUBLICATIONS

Machine translation of JP11055918A published Feb. 1999.*

* cited by examiner

*Primary Examiner* — Walter Benson
*Assistant Examiner* — Kawing Chan
(74) *Attorney, Agent, or Firm* — Harness, Dickey & Pierce, P.L.C

(57) ABSTRACT

The brushless motor has a first and second drive member. The first drive member is equipped with M phase coil groups each having N electromagnetic coils where M is an integer of 1 or greater and N is an integer of 1 or greater. The second drive member has a plurality of permanent magnets, and is able to move relative to the first drive member. The first drive member has 2 (M×N) magnetic body cores. Each phase electromagnetic coil is coiled on a periodically selected magnetic body core at a ratio of 1 to 2M from among the arrangement of 2 (M×N) magnetic body cores.

11 Claims, 26 Drawing Sheets

Magnetic yoke structure example 1(nonuniform left to right)

Embodiment

| Magnetic flux density[G] | | | |
|---|---|---|---|
| PA | PB | PC | PD |
| 33 | 33 | −23 | −23 |

Comparative Example

| Magnetic flux density[G] | | | |
|---|---|---|---|
| PA | PB | PC | PD |
| 33 | 33 | −33 | −33 |

Magnetic flux

Magnetic yoke structure example 1(nonuniform left to right)

Magnetic yoke structure example 2(nonuniform due to recession)

Magnetic yoke structure example 3(nonuniform due to protrusion)

Magnetic yoke structure example 4(nonuniform due to core portion)

$Y = a \cdot X + b$
or
$Y = a(X + b)$ 2-pole parallel winding 2-pole serial winding Fig. 12A
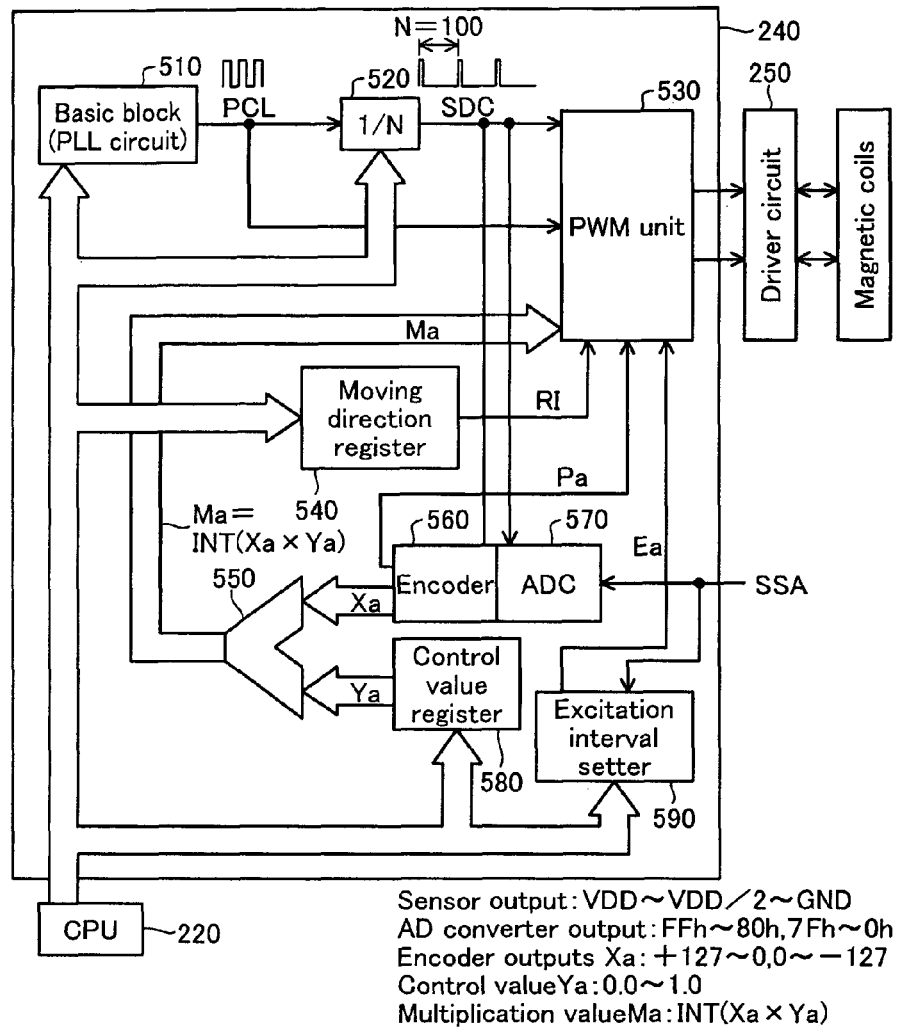
Fig. 12B
Fig. 12C
Fig. 12D
Fig. 12E
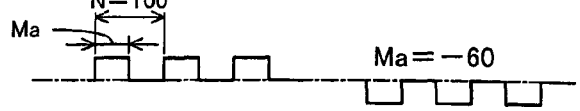

Fig.13A
Fig.13B
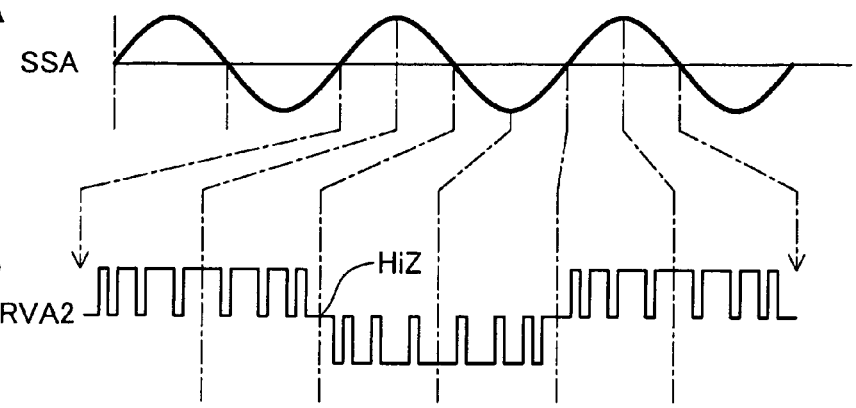
Fig.13C
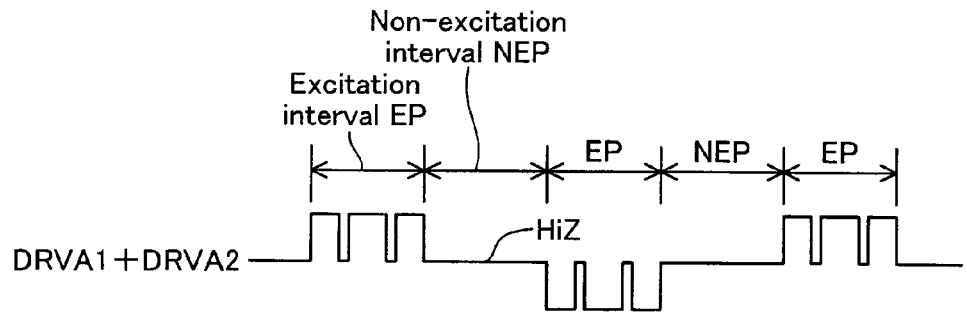

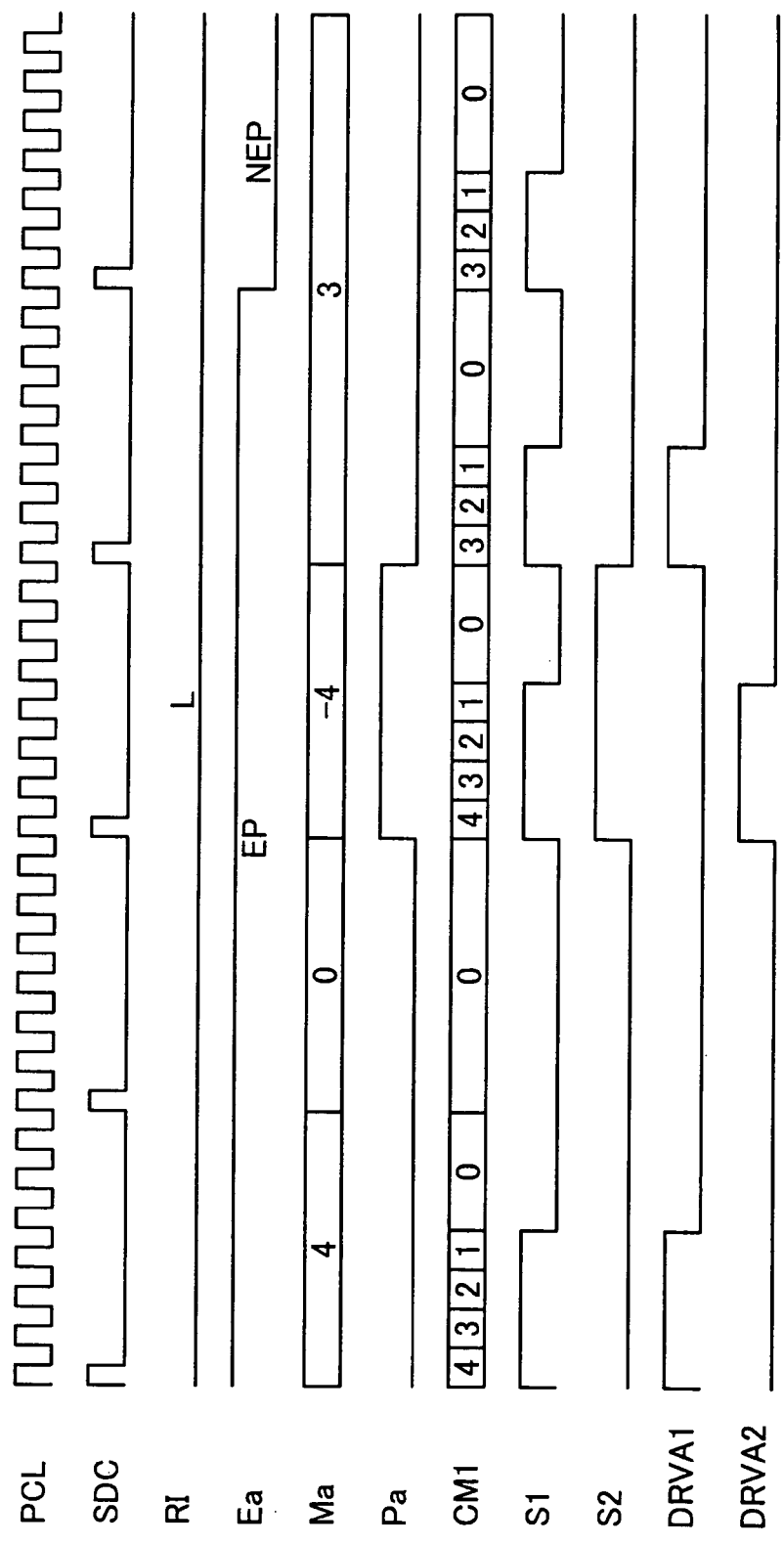

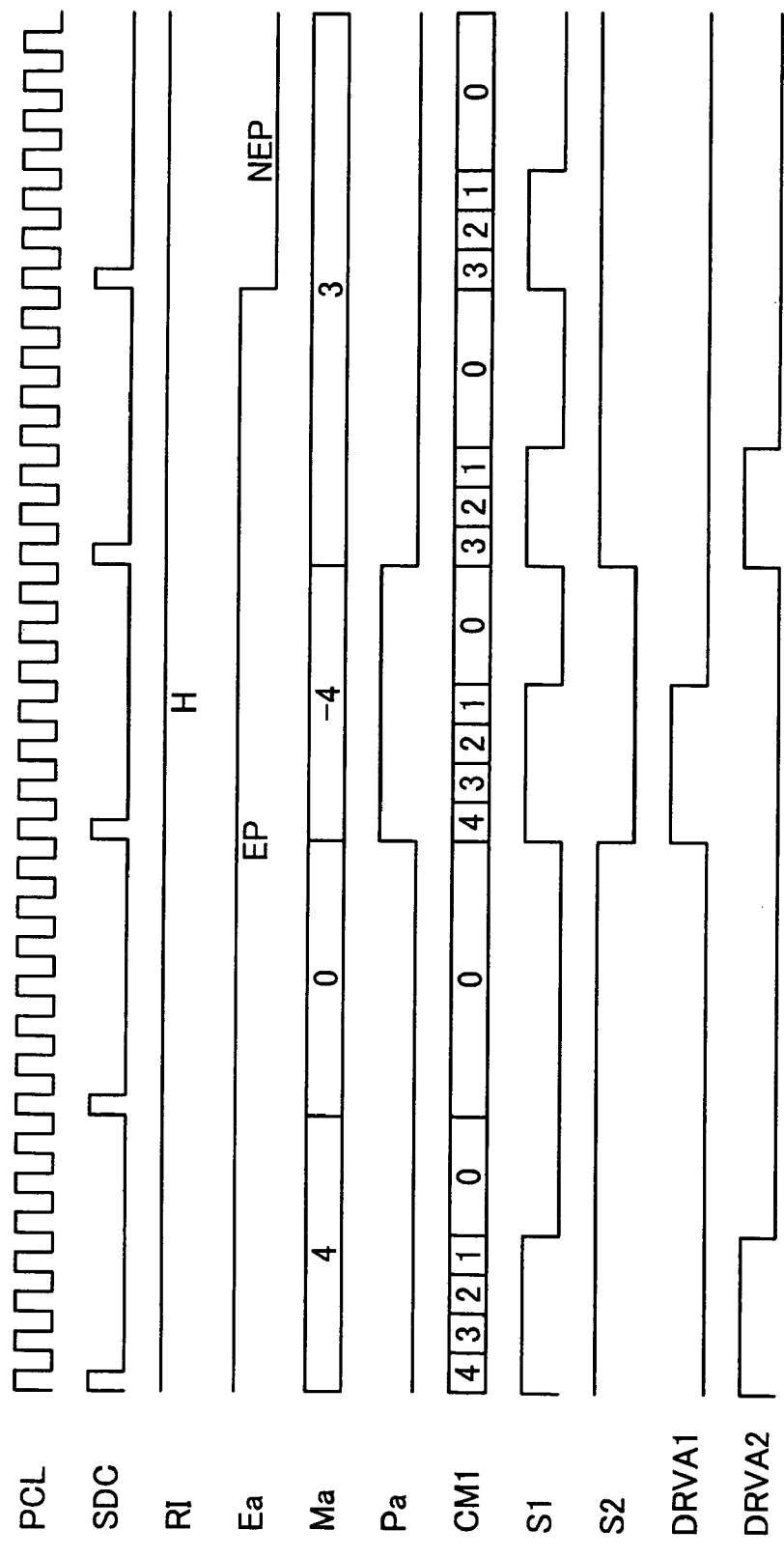

Driving by rectangular wave

Current attenuates in association with increased speed

Driving by sine wave

Current attenuates in association with increased speed

Fig.19A
2-phase motor
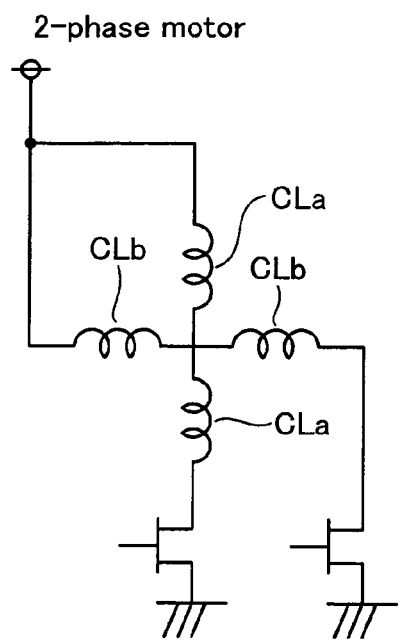
Fig.19B
1-phase motor
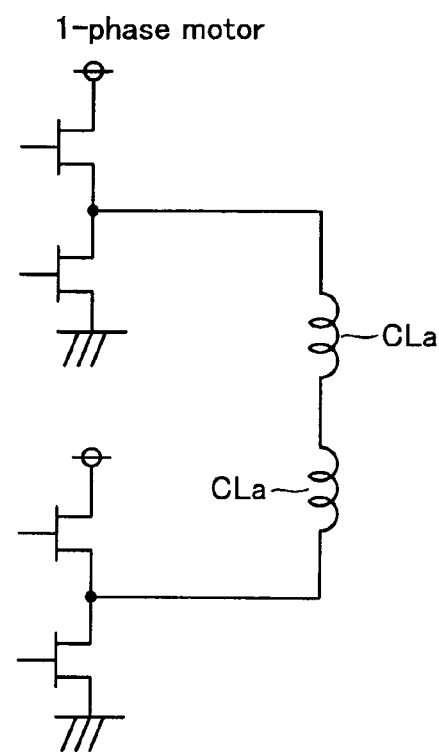
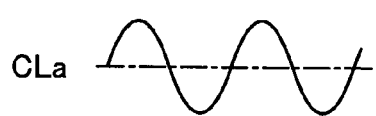

| | Prior Art | Embodiment | | | |
|---|---|---|---|---|---|
| | 2-phase drive | 1-phase drive | | | |
| | Rectangular wave | Rectangular wave drive | | Sine wave drive | |
| Rotation speed [rpm] | Power [W] | Power [W] | Improvement rate [%] | Power [W] | Improvement rate [%] |
| 1800 | 0.75 | 0.46 | 38.2 | 0.38 | 48.9 |
| 2000 | 0.92 | 0.62 | 32.7 | 0.50 | 45.3 |
| 2500 | 1.58 | 1.12 | 29.1 | 0.94 | 40.5 |
| 3000 | 2.73 | 2.00 | 26.6 | 1.66 | 39.2 |
| 3500 | 4.51 | 3.52 | 22.0 | 2.74 | 39.3 |
| 4000 | 7.11 | 5.93 | 16.6 | 4.28 | 39.8 |

Fig.20B Rotation speed-Power characteristics

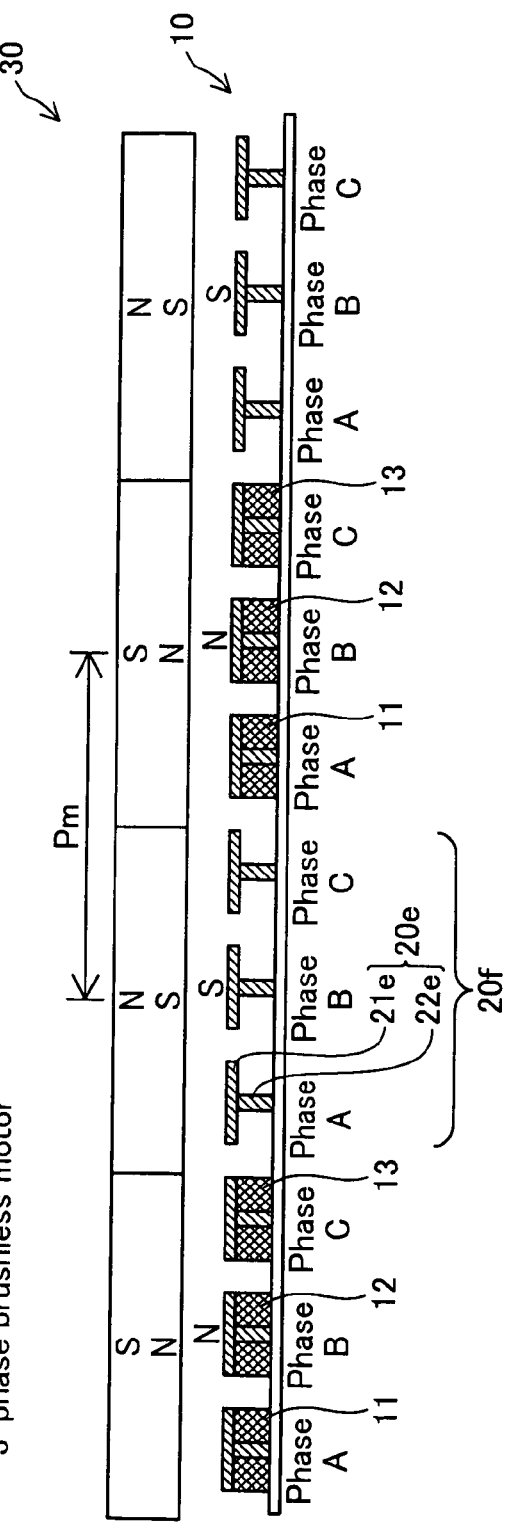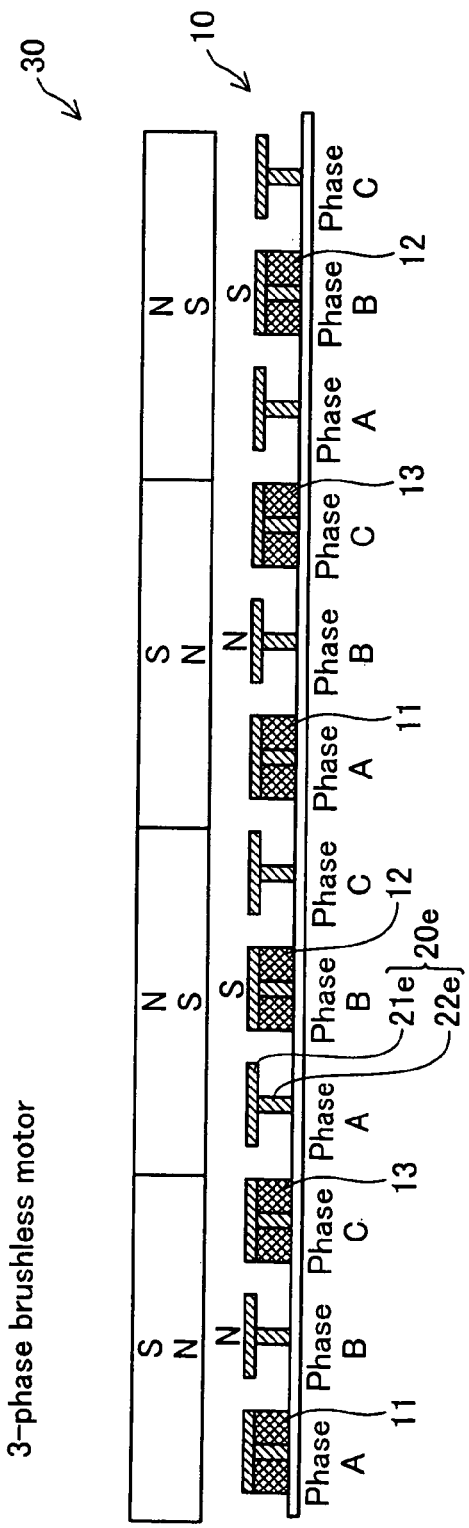
Fig.23A 3-phase brushless motor
Fig.23B 3-phase brushless motor

BRUSHLESS MOTOR

CROSS-REFERENCE TO RELATED APPLICATIONS

The present application claims the priority based on Japanese Patent Applications No. 2007-101599 filed on Apr. 9, 2007, and No. 2008-1585 filed on Jan. 8, 2008, the disclosures of which are hereby incorporated by reference in their entireties.

BACKGROUND OF THE INVENTION

1. Field of the Invention

This invention relates to a brushless motor using permanent magnets and electromagnetic coils.

2. Description of the Related Art

In the motor industry, both one-phase motors and two-phase motors are collectively called "single phase motors." However, with the description below, "single phase motor" means only one-phase motors, and excludes two-phase motors.

A brushless motor using permanent magnets and electromagnetic coils is disclosed, for example, in JP2001-298982A.

With this prior art brushless motor, control is performed using on/off signals from digital magnetic sensors. In specific terms, the timing of the polarity inversion of the applied voltage to the electromagnetic coils is determined using the on/off signals of the digital magnetic sensors. Also, three-phase drive signals are used as the drive signals.

From the past, there has been a desire for improved efficiency of various types of motors including brushless motors. However, as a result of improvements in motors over many years, in recent years, it has become difficult to find new mechanisms for improving motor efficiency.

Regarding brushless motors, there have further been the following kinds of problems. Specifically, with conventional brushless motors, drive signals of two or more phases are used, and there are no motors using single-phase drive signals. The reason for this is related to the startup characteristics of the single-phase motor described hereafter.

The single-phase motor has the characteristic of not being able to start up when the permanent magnets and coils stop at directly facing positions. This position is called the "deadlock point" or the "dead point." Because of this, with the normal single-phase motor, an auxiliary coil is provided for reliably performing startup, and a startup method is used whereby current is flowed to the auxiliary coil only during startup. Also, with certain types of single-phase motors, a capacitor is used to displace the phase of the main coil and the auxiliary coil.

Meanwhile, with a normal brushless motor, a so-called inverter drive is used. However, when the single-phase motor is started up using inverter drive, a large current is flowed to the auxiliary coil or capacitor during startup, so the problem arises of damage to the switching component and capacitor occurring easily. In this way, there has been the problem that constituting the single-phase motor as a brushless motor is difficult.

SUMMARY OF THE INVENTION

An object of the present invention is to provide a technique of improving motor efficiency. Another object of this invention is to provide a single-phase brushless motor that can start up without having a deadlock point, and without an auxiliary coil.

According to an aspect of the present invention, there is provided a brushless motor, which is equipped with a first drive member including M phase coil groups each having N electromagnetic coils where M is an integer of 1 or greater and N is an integer of 1 or greater; a second drive member including a plurality of permanent magnets, the second drive member movable relative to the first drive member; a magnetic sensor, disposed on the first drive member, for detecting relative position of the magnets and the coils; and a drive control circuit for generating an application voltage to drive the coils based on an output signal of the magnetic sensor. The first drive member has 2 (M×N) number of magnetic body cores. Each phase electromagnetic coil is coiled on a magnetic body core regularly selected at a ratio of 1 to 2M from among the 2 (M×N) magnetic body cores.

With this brushless motor, the electromagnetic coil is coiled on the magnetic body core selected regularly at a ratio of 1 to 2M from among the arrangement of the 2 (M×N) magnetic body cores, so it is possible to omit the number of electromagnetic coils, and to reduce the copper loss due to the electromagnetic coils, making it possible to improve the efficiency. Also, for magnetic body cores on which an electromagnetic coil is not coiled as well, fairly large magnetic flux is generated in the reverse direction of the magnetic flux that is generated with the magnetic body core for which an electromagnetic coil is coiled, so there is no excessive decrease in motor output.

Note that this invention can be realized with various aspects, for example it is possible to realize it with aspects such as a brushless motor and its control method (or drive method), an actuator using these, or the like.

BRIEF DESCRIPTION OF THE DRAWINGS

FIGS. 12A to 12E illustrate internal configuration and operation of a drive signal generator;

FIGS. 13A to 13C illustrate correspondence relationships of sensor output waveform and drive signal waveform;

FIG. 15 is a timing chart depicting operation of the PWM unit during forward rotation of the motor;

FIG. 16 is a timing chart depicting operation of the PWM unit during reverse rotation of the motor;

FIGS. 19A and 19B are illustrations comparing wire connections and operation of a conventional two-phase motor and the single-phase motor of an embodiment of the invention;

FIGS. 20A and 20B show a comparison of the characteristics of the conventional motor and the motor of the embodiment;

FIGS. 23A and 23B show the summary constitution of the three-phase brushless motor of another embodiment of this invention;

DESCRIPTION OF THE PREFERRED EMBODIMENT

Figure 1B:
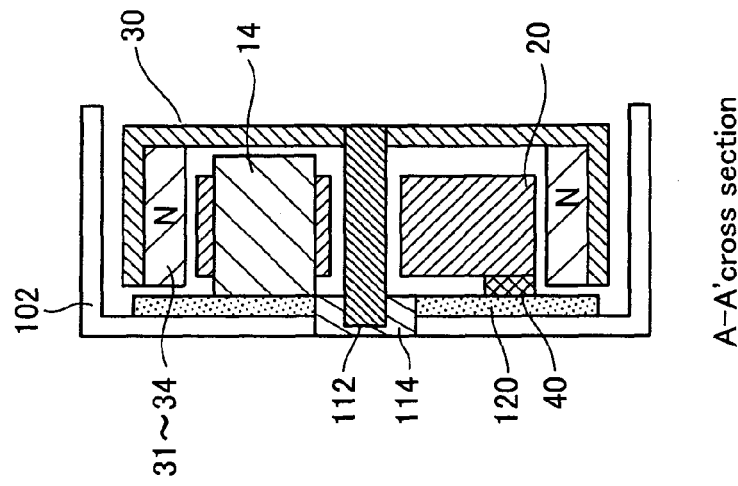
FIGS. 1A and 1B are cross section diagrams showing the constitution of the motor main unit of the electric motor for the embodiment.
Figure 1A:
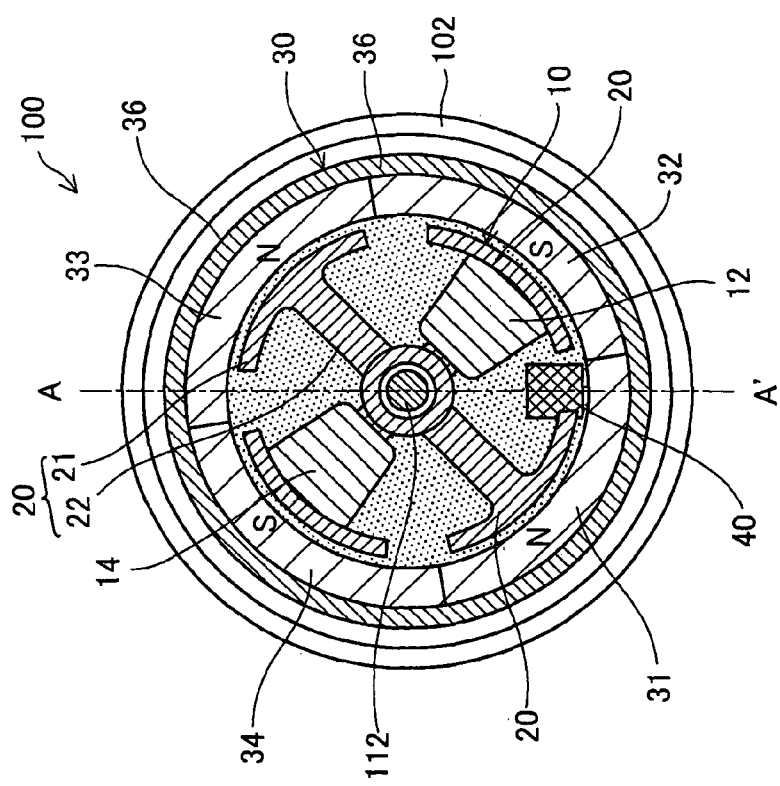

Some aspects of the present invention will be described in the following sequence.
A. Summary of the Motor Constitution and Operation
B. Constitution of the Drive Control Circuit
C. Other Embodiments of the Motor Constitution
D: Variation Examples A. Summary of the Motor Constitution and Operation FIGS. 1A and 1B are cross section diagrams showing the constitution of the motor main unit of the single-phase brushless motor as an embodiment of this invention. This motor main unit 100 has a stator unit 10 and a rotor unit 30 for which the respective outer shapes are roughly circular. The stator unit 10 has four magnetic yokes 20 arranged in roughly a cross shape. Each magnetic yoke 20 is constituted using a magnetic substance, and has a core member 22 and a motor stop position regulating member 21 (also called the "positioning member"). There will be further description of the detailed shape of the magnetic yoke 20. Around the core member 22 of opposing two magnetic yokes 20, electromagnetic coils 12 and 14 are coiled, and magnetic coils are not coiled on the other two magnetic yokes 20. To say this another way, the electromagnetic coils are coiled on the magnetic yokes 20 at a ratio of 1 to 2. At the center position between the two magnetic yokes 20 at the bottom is arranged a magnetic sensor 40. The magnetic sensor 40 is for detecting the position of the rotor unit 30 (specifically, the phase of the motor). The coils 12 and 14 and the magnetic sensor 40 are fixed on the circuit substrate 120 (FIG. 1B). The circuit substrate 120 is fixed in a casing 102. Note that the lid of the casing 102 is not illustrated.

The rotor unit 30 has four permanent magnets 31 to 34, and the central axis of the rotor unit 30 constitutes the rotation axis 112. This rotation axis 112 is supported by a bearing 114 (FIG. 1B). The magnetization direction of each magnet is the direction facing to an outward radiating shape from the rotation axis 112. The magnetic yoke 36 is provided at the outer periphery of the magnets 31 to 34. However, it is also possible to omit this magnetic yoke 36.

Figure 2A:
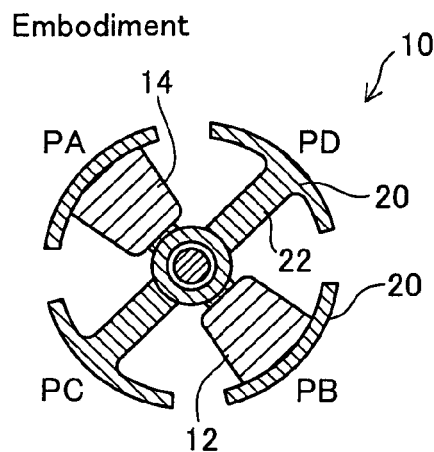
FIGS. 2A to 2C show the experiment results of the magnetic flux density for the stator part of the embodiment and the comparison example.
Figure 2B:
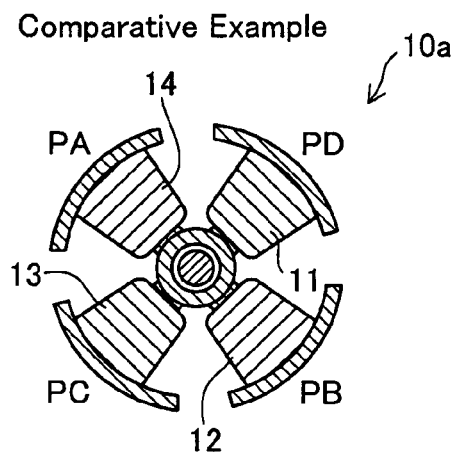
Figure 2C:
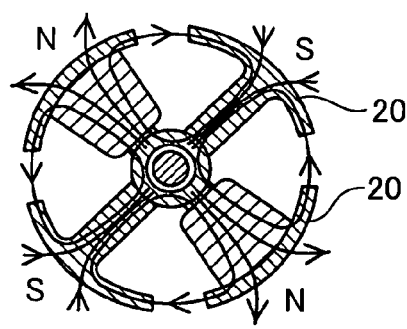

FIGS. 2A to 2C show the experiment results for magnetic flux density at the stator unit of the embodiment and a comparison example. FIG. 2A shows the stator unit 10 of the embodiment shown in FIG. 1, and FIG. 2B shows a stator unit 10a of the comparison example. With the stator unit 10a of the comparison example, the electromagnetic coils 11 to 14 are respectively coiled around the core member 22 of the four magnetic yokes 20. The magnetic flux density at the positions PA to PD on the outer periphery of the four magnetic yokes 20 were measured respectively for this embodiment and the comparative example. As shown at the bottom of FIG. 2A and 2B, the magnetic flux density measured at the magnetic yoke for which an electromagnetic coil is not coiled is approximately 2/3 of the magnetic flux density measured at the magnetic yoke for which an electromagnetic coil is coiled. Therefore, even when electromagnetic coil is coiled at a ratio of 1 to 2 in relation to the magnetic yoke (or the magnetic body core), and electromagnetic coils are not coiled on the remaining magnetic yokes, it was confirmed that a fairly large magnetic flux density is obtained for the latter magnetic yokes. Presumably the large magnetic flux is obtained because, as shown by the arrows in FIG. 2C, the magnetic circuit is constituted by the four magnetic yokes 20.

However, though electromagnetic coils are essential for generating drive power, on the other hand, this also is a cause of copper loss, or a cause of weight increase and cost increase. In light of this, with this embodiment, by not coiling an electromagnetic coil on part of the core member, there is a lessening of the negative causes of copper loss and the like, and this will improve the motor efficiency.

Figure 3A:
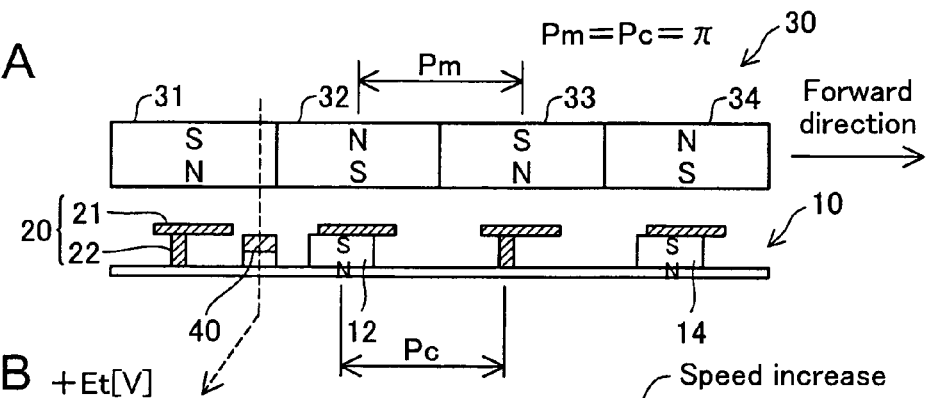
FIGS. 3A to 3C show the positional relationship of the magnet array and the coil array, and the relationship between the magnetic sensor output and the coil back electromotive force waveform.
Figure 3B:
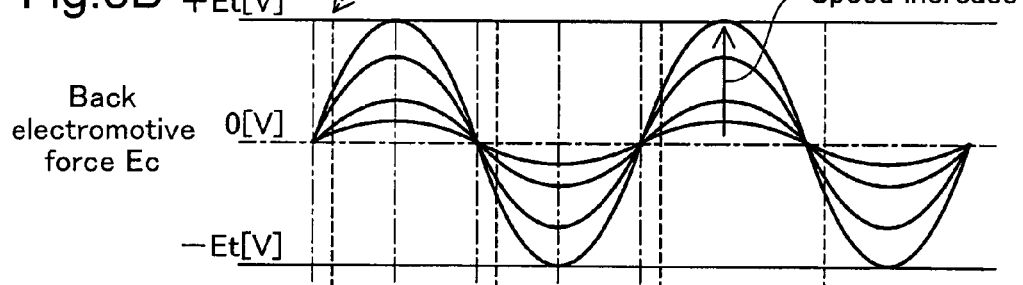
Figure 3C:
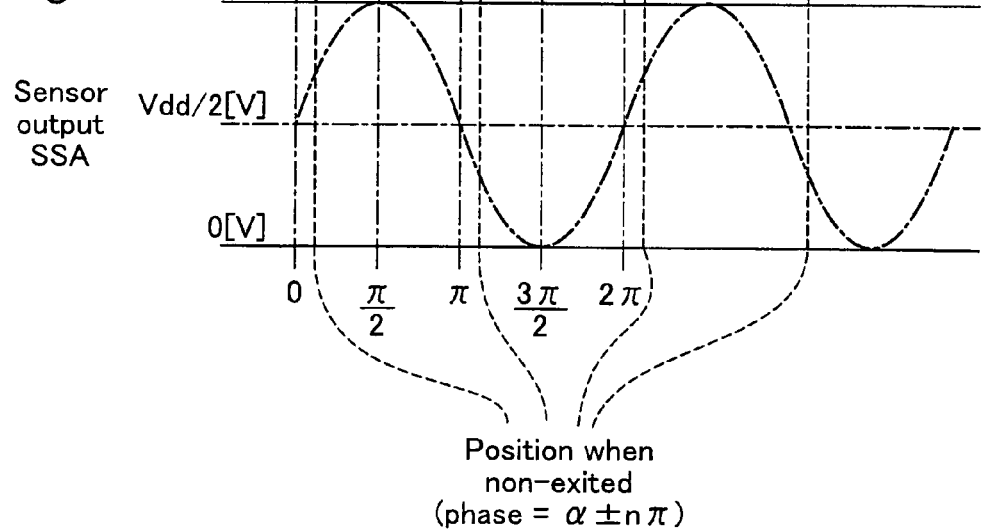

FIGS. 3A to 3C show the positional relationship of the magnet array and the coil array, and the relationship between the magnetic sensor output and the back electromotive force waveform of the coil. As shown in FIG. 3A, the four magnets 31 to 34 are arranged at a constant magnetic pitch Pm, and the magnets are magnetized in the direction opposite to their adjacent magnets. Also, the magnetic yoke 20 including the core member 22 and the positioning member 21 are arranged at a constant pitch Pc. As shown as the comparative example in FIG. 2B, when a coil is coiled on all the core members, adjacent coils are magnetized in the opposite direction to each other (specifically, at phase difference π). However, with this embodiment, the coils 12 and 14 are coiled on the coil member at a ratio of 1 to 2, so these two coils 12 and 14 are magnetized in the same direction (specifically, in the same phase). With this embodiment, the magnetic pole pitch Pm is equivalent to the core member 22 pitch Pc, and also to an electrical angle of π. Note that the electrical angle of 2π correlates to the mechanical angle or distance of movement when the drive signal phase changes by 2π. With this embodiment, when the drive signal phase changes by $2\pi$, the rotor unit 30 moves by twice the magnetic pole pitch Pm.

As described above, the two coils 12 and 14 are driven by drive signals of the same phase. Therefore, the drive method for the motor of this embodiment is single-phase drive. However, with the motor drive method, coils driven with drive signals for which the phase is displaced by 180 degrees ($=\pi$) are often seen as belonging to the same phase. Therefore, both motors for which all the coils are driven with only one type of drive signal and motors for which all the coils are driven with two types of drive signals for which the phase difference is $\pi$ can be thought of as single-phase motors. In this sense, the comparative example shown in FIG. 2B may also be used as a stator for a single-phase brushless motor.

FIG. 3A shows the positional relationship of the magnets 31 to 34 and the coils 12 and 14 when the motor is stopped. With the motor of this embodiment, the positioning member 21 of each magnetic yoke 20 is provided at a position slightly displaced in the positive rotation direction of the rotor unit 30 from the center of each coil (or the center of the core member 22). When the motor is stopped, each magnet yoke 20 is pulled by the magnets 31 to 34, and the rotor unit 30 stops at a position at which the positioning member 21 faces the center of each magnet 31 to 34. As a result, the motor stops at a position for which the center of each coil 12 and 14 is displaced from the center of the magnets (magnets 32 and 34 with the example in FIG. 3A). Also, at this time, the magnetic sensor 40 is at a position slightly displaced from a boundary between two magnets. The phase of this stop position is $\alpha$. The phase $\alpha$ may be set to any value that is not zero. For example, it is possible to set the phase $\alpha$ to a small value near zero (approximately 5 degrees to 10 degrees), or to use a value near 90 degrees.

FIG. 3B shows an example of a back electromotive force waveform generated on a coil, and FIG. 3C shows an example of an output waveform of the magnetic sensor 40. The magnetic sensor 40 is able to generate a sensor output SSA of almost the same shape as the back electromotive force of the coil during motor operation. However, the output SSA of the magnetic sensor 40 shows a value that is not 0 even when the motor is stopped (except when the phase is an integral multiple of $\pi$). Note that the coil back electromotive force has a tendency to rise together with the motor rotation speed, but the wave shape (sine wave) is kept at almost the same shape. As the magnetic sensor 40, it is possible to use a Hall IC that uses a Hall effect, for example. With this example, the sensor output SSA and the back electromotive force Ec are both sine waves or have waveforms close to a sine wave. As is described later, the drive control circuit uses the sensor output SSA and applies voltage having almost the same waveform as the back electromotive force Ec to the coils 12 and 14.

Incidentally, electric motors function as an energy conversion device that mutually converts mechanical energy and electrical energy. The coil back electromotive force is obtained by converting mechanical energy of the motor to electric energy. Therefore, when the electric energy applied to the coil is converted to mechanical energy (that is, when the motor is driven), it is possible to drive the motor with the optimal efficiency by applying voltage of a similar waveform as the back electromotive force. Note that as described hereafter, "voltage of a similar waveform as the back electromotive force" means voltage that generates current in the reverse direction as the back electromotive force.

Figure 4:
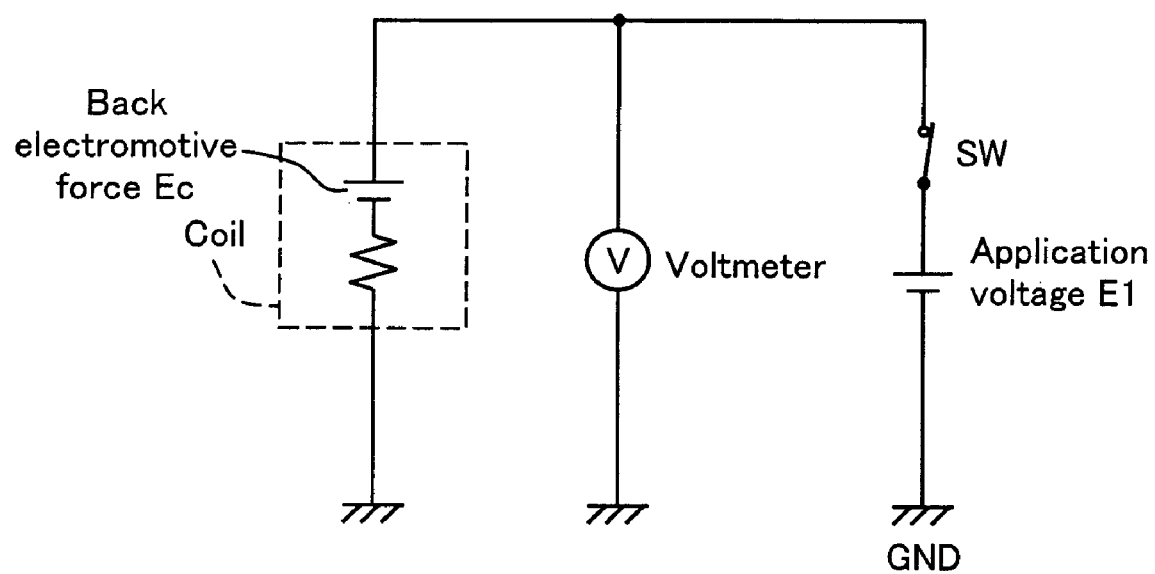
FIG. 4 is a pattern drawing showing the relationship between the coil application voltage and the back electromotive force.

FIG. 4 schematically shows relationship between the coil application voltage and the back electromotive force. Here, the coil is simulated by the back electromotive force Ec and resistance. Also, with this circuit, the voltmeter V is connected in parallel to the applied voltage E1 and the coil. When the voltage E1 is applied to the coil and the motor is driven, the back electromotive force Ec is generated which causes a current in the reverse direction of the applied voltage E1. When the switch SW is opened in a state with the motor rotating, it is possible to measure the back electromotive force Ec with the voltmeter V. The polarity of the back electromotive force Ec measured in the state with the switch SW open is the same polarity as the applied voltage E1 measured in the state with the switch SW closed. With the description above, the phrase, "applying a voltage of almost the same waveform as the back electromotive force" means applying a voltage having a waveform of almost the same shape that has the same polarity as the back electromotive force Ec measured by this kind of voltmeter V.

As described above, it is possible to drive the motor with the optimal efficiency by applying a voltage of a similar waveform as the back electromotive force. Note that near the middle point of the sine wave shaped back electromotive waveform (near voltage 0), the energy conversion efficiency is relatively low, and conversely, near the peak of the back electromotive force waveform, we can see that the energy conversion efficiency is relatively high. When applying a voltage of a similar waveform as the back electromotive force to drive the motor, a relatively high voltage will be applied during the periods of high energy conversion efficiency, so the motor efficiency improves. Meanwhile, for example when driving the motor with a simple square wave, even near the position for which the back electromotive force is almost 0 (at its middle point), a fairly high voltage is applied, thereby decreasing the motor efficiency. When the voltage is applied during periods of low energy conversion efficiency in this way, vibration occurs in directions other than the rotation direction due to the eddy current, thereby causing a noise problem.

As can be understood from the description above, when a voltage of a similar waveform as the back electromotive force is applied to drive the motor, it is possible to improve the motor efficiency, and there is the advantage that it is possible to reduce vibration and noise.

Figure 5A:
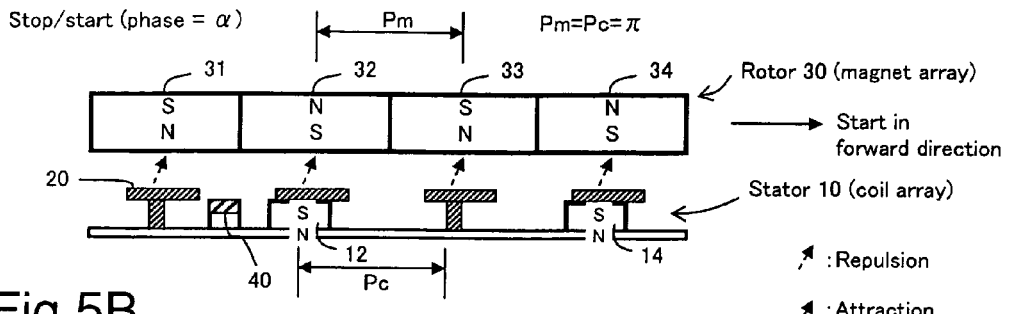
FIGS. 5A to 5E show the states of the motor in forward rotation operation.

FIG. 5A to 5E are explanatory drawings showing the state of forward rotation operation of the motor main unit 100. FIG. 5A shows the positional relationship of the magnets 31 to 34 and the coils 12 and 14 when stopped, and is the same drawing as FIG. 3A. When the coils 12 and 14 are magnetized in the state in FIG. 5A, the repulsive force shown by the dotted line arrow occurs between the coils 12, 14 and the magnets 31-34 (or between the magnetic yokes 20 and the magnets 31-34). As a result, the rotor unit 30 is started in the forward rotation direction (rightward in the drawing). Note that the repulsion force from the magnetic yoke 20 to the magnet occurs according to the magnetic flux density at each magnetic yoke described with FIGS. 2A-2C. Note that an attraction force occurs between the magnetic yoke 20 and the magnets 31 to 34 due to the magnetic force of the magnets, but it is omitted from the illustration in FIGS. 5A-5E.

Figure 5B:
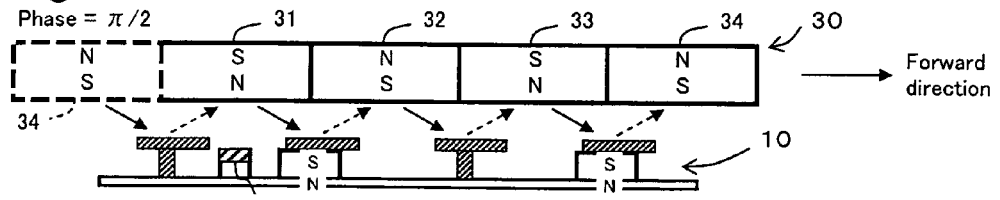
Figure 5C:
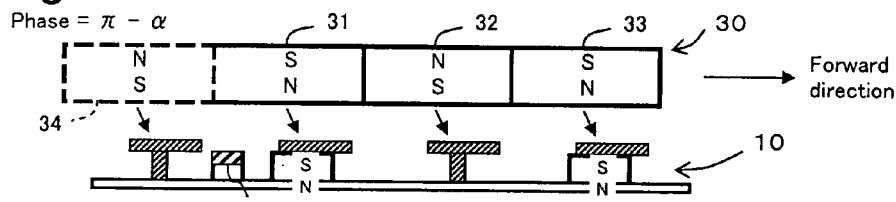
Figure 5D:
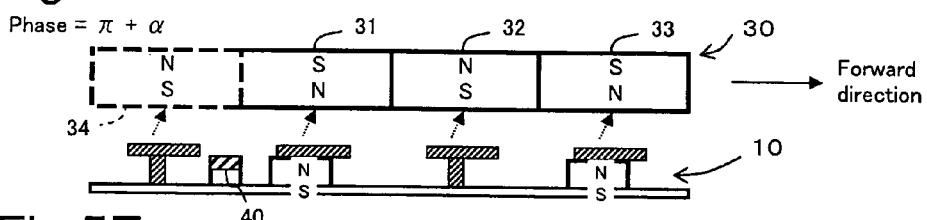
Figure 5E:
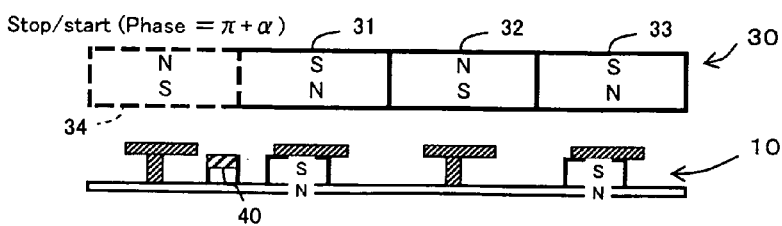

FIG. 5B shows the state with the phase advanced up to $\pi/2$. In this state, attraction force (solid line arrow) and repulsion force (dotted line arrow) are generated, and a large drive force is generated. FIG. 5C shows the state with the phase advance up to ($\pi-\alpha$). At the timing when the phase becomes $\pi$, the coil magnetization direction reverses, and goes to the state shown in FIG. 5D. When the motor stops near the state shown in FIG. 5D, as shown in FIG. 5E, the rotor unit 30 stops at the position at which the magnetic yoke 20 is pulled to the magnets 31 to 34. This position is the position at which the phase is ($\pi+\alpha$).

In this way, we can understand that the motor of this embodiment stops at the position for which the phase is $\alpha \pm n\pi$ where n is an integer.

Figure 6A:
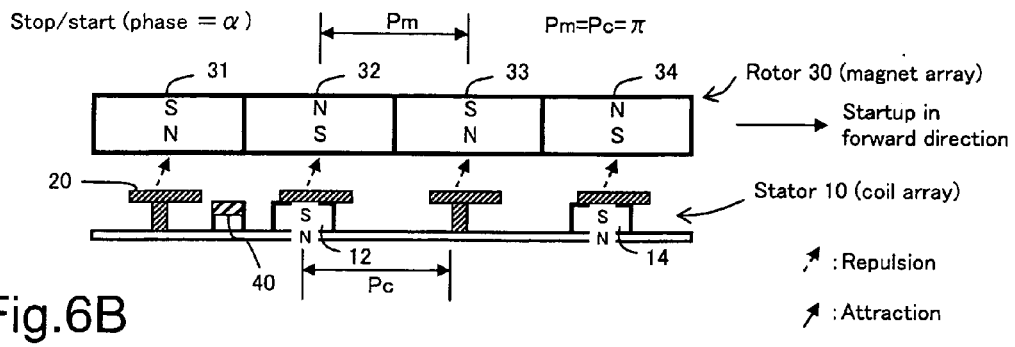
FIGS. 6A to 6E show the states of the motor in reverse rotation operation.

FIG. 6A to 6E are explanatory drawings showing the state of the reverse operation of the motor main unit 100. FIG. 6A shows the state when stopped, and is the same as FIG. 5A. To reverse from this stopped state, if the coils 12 and 14 are magnetized in the reverse direction from FIG. 5A, then the attraction force (not illustrated) will operate between the magnets 31-34 and the coils 12, 14. This attraction force works in the direction that reverses the rotor unit 30. However, because this attraction force is quite weak, it may not be sufficiently large to overcome another attraction force between the magnets 31 to 34 and the magnetic yokes 20, whereby it is not possible to reverse the rotor unit 30.

Figure 6B:
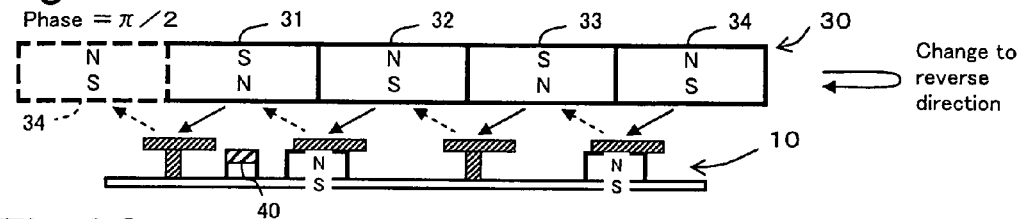
Figure 6C:
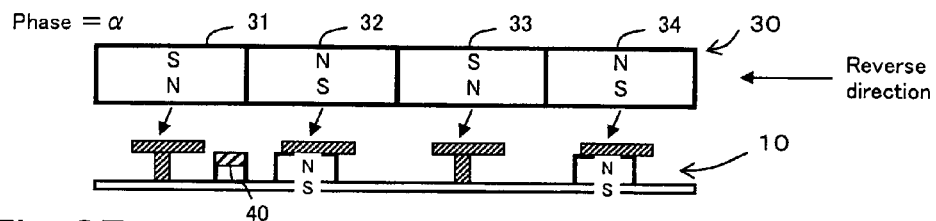
Figure 6D:
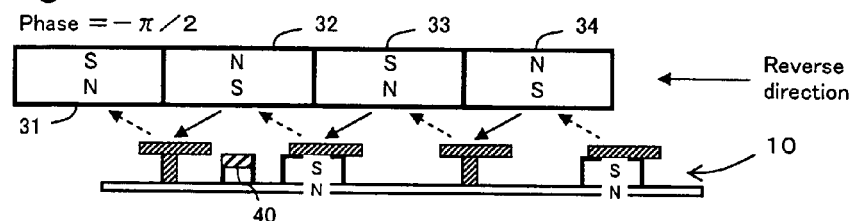
Figure 6E:
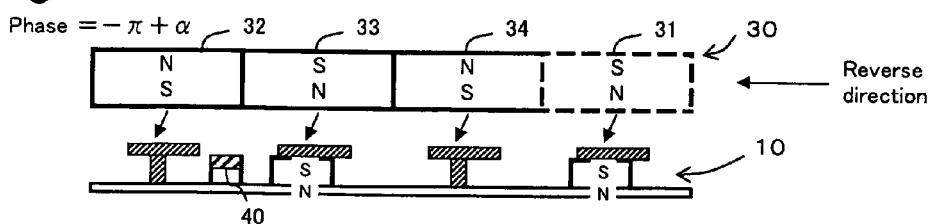

In light of this, with this embodiment, even when performing the reverse rotation operation, forward rotation operation is initiated as shown in FIG. 6A during startup. Then, after the rotor unit 30 has been rotated by a specified amount (for example, when the phase has advanced by approximately $\pi/2$), the drive signals are reversed as shown in FIG. 6B, and the reverse rotation operation is started. In this way, once the rotor unit 30 starts reverse rotation, after that, it is possible to pass through the initial stop position (phase=$\alpha$) due to the inertia of the rotor unit 30 (FIG. 6C). After that, at the timing when the phase is 0, the coil magnetization direction reverses. FIG. 6D shows the state when the phase is $-\pi/2$, and FIG. 6E shows the state when the phase is $-\pi+\alpha$. When the motor stops near the state shown in FIG. 6E, the rotor unit 30 stops at the position for which the magnetic yoke 20 is pulled to the magnets 31 to 34 (at phase=$-\pi+\alpha$).

Figure 7:
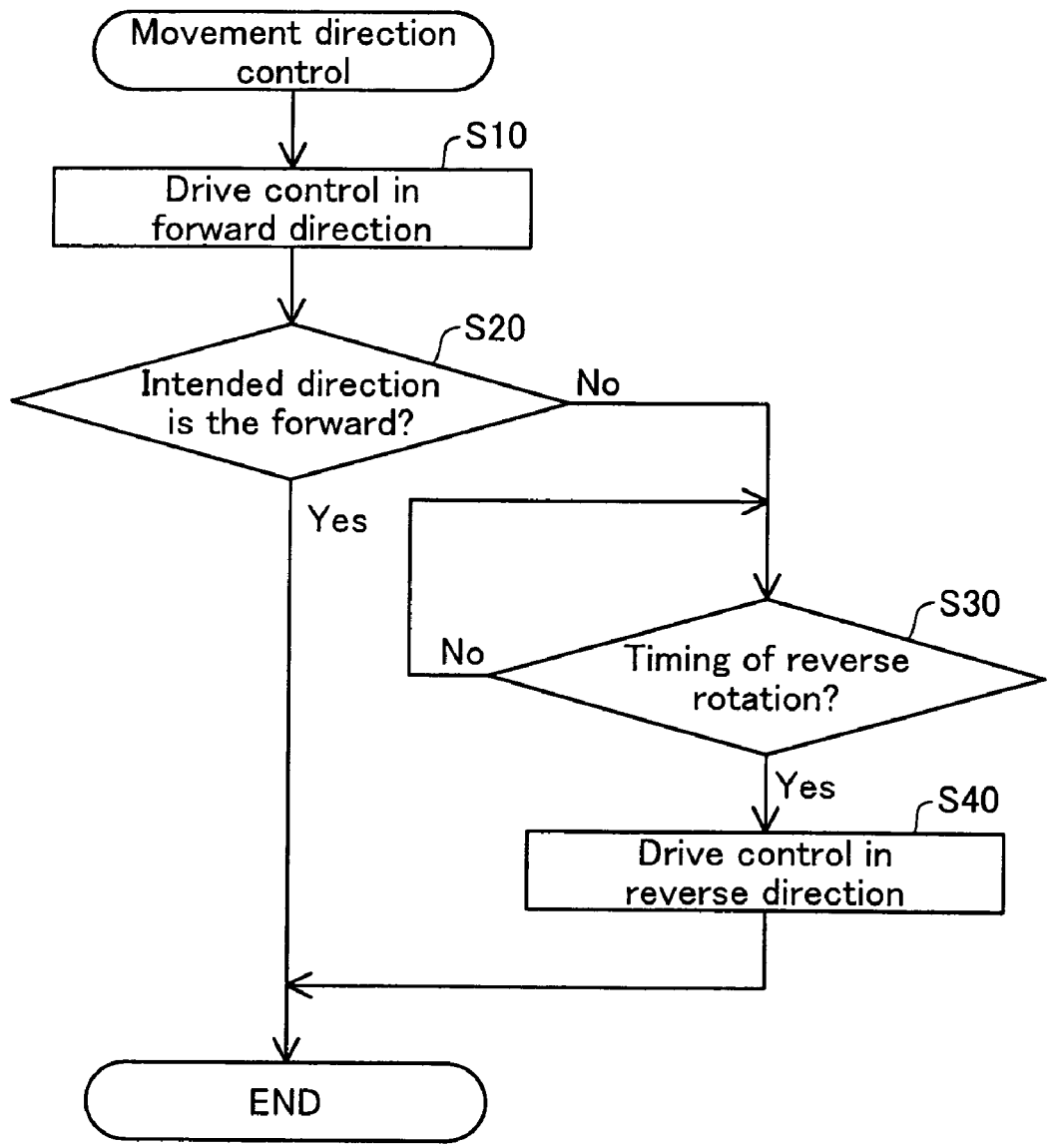
FIG. 7 is a flow chart showing the procedure for controlling the motor movement direction.

FIG. 7 is a flow chart showing the procedure for controlling the motor movement direction. This procedure is executed by the drive control circuit described later. At step S10, first, the drive control starts in the forward direction. At step S20, a judgment is made of whether or not the target movement direction is the forward direction. Note that the movement direction is input to the drive control circuit by the operator before step S10. When the target movement direction is the forward direction, the forward direction drive control continues as is. Meanwhile, when the target movement direction is the reverse direction, at step S30, the system waits until a specified timing at which to reverse. Then, when the timing at which to reverse is reached, the reverse direction drive control starts at step S40.

As described above, with the motor of this embodiment, the motor stops at the position at which the phase is $\alpha \pm n\pi$ ($\alpha$ is a specified value that is not zero and not $n\pi$, and n is an integer), so a deadlock point does not occur. Therefore, a startup coil is not required, and it is always possible to start up. Also, with the motor of this embodiment, by doing reverse rotation after forward rotation by a specified amount from the stopped state, it is possible to realize the reverse rotation operation. Note that when the phase $\alpha$ at which the motor is stopped is set to a value near 90 degrees, it is also possible to do reverse rotation without doing forward rotation during startup. In particular, if the magnetic yoke is constituted so that the motor stops at the position where $\alpha=\pi/2$, the motor stops at the peak position of the back electromotive force, so it is possible to start the motor in either forward or reverse rotation direction with a strong driving force.

Figure 8A:
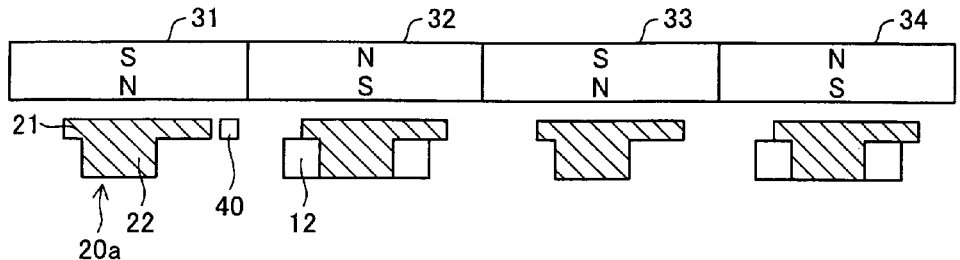
FIGS. 8A to 8D show various types of specific constitution examples of the magnetic yoke.
Figure 8B:
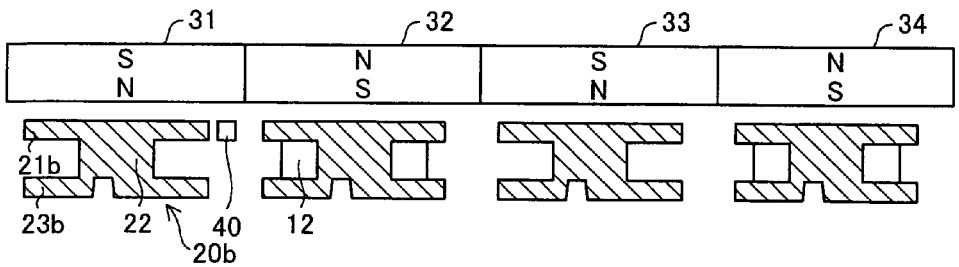
Figure 8C:
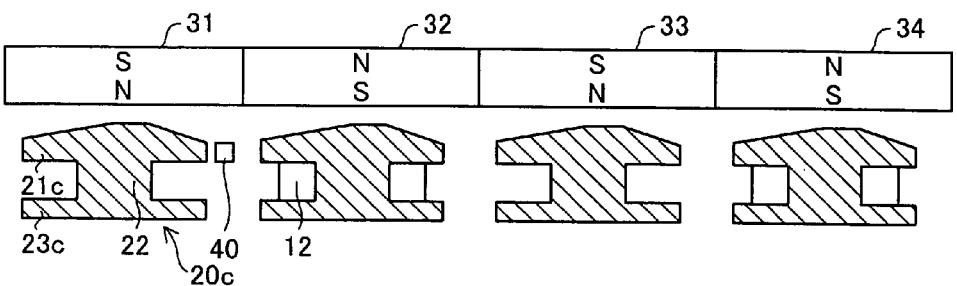
Figure 8D:
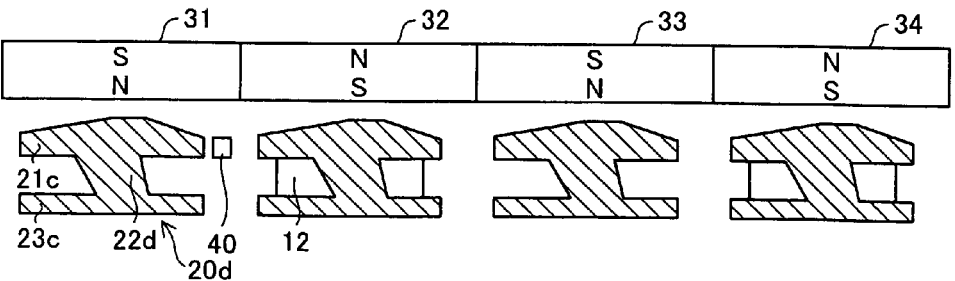

FIGS. 8A to 8D show various constitutions of the magnetic yoke 20; in these drawings, the parts marked by diagonal lines are the magnetic members that constitute the magnetic yoke. Note that it is preferable that the magnetic yoke 20 be formed of a ferromagnetic body. The first magnetic yoke 20a shown in FIG. 8A has a plate shaped member 21 arranged between the coil 12 and the magnets 31 to 34, and a core member 22 for increasing the magnetic flux density. The plate shaped member 21 is formed in a shape for which the left and right are unbalanced, and this functions as a positioning member that regulates the motor stop position. Specifically, when the magnetic yoke 20a having the positioning member 21 is pulled to the magnet, it is possible to have the motor stop with the center of the coil at a position displaced from the center of the magnet. The second magnetic yoke 20b shown in FIG. 8B has plate shaped members 21b and 23b provided at the top and bottom of the core member 22. The first plate shaped member 21b at the top of the magnet is even laterally, but the second plate shaped member 23b at the bottom is provided with a concave part at a position displaced slightly to the left side from the center, whereby its shape is laterally unbalanced. With this example, the second plate shaped member 23b functions as the positioning member. The third magnetic yoke 20c shown in FIG. 8C also has plate shaped members 21c and 23c provided at the top and bottom of the core member 22. With this example, the first plate shaped member 21c at the top of the magnet has a convex shape which is laterally unbalanced, and the second plate shaped member 23b at the bottom has a shape which is laterally even. Therefore, with this example, the first plate shaped member 21c functions as the positioning member. The fourth magnetic yoke 20d shown in FIG. 8D is changed from the magnetic yoke shown in FIG. 8C so that the core member 22d is laterally unbalanced. With this example, the core member 22d and the first plate shaped member 21c function as positioning members.

Note that with the magnetic yokes 20b and 20d shown in FIG. 8B and 8D, the portions other than the plate shaped members 21b and 21c (the portions positioned between the coils and the magnets) have a shape that is unbalanced in regard to the motor operating direction (lateral direction), so with these magnetic yokes 20b and 20d, it is possible to omit the plate shaped members 21b and 21c. However, these portions 21b and 21c between the coils and the magnets will attain a preferable stop positioning function with a relatively small volume of magnetic members.

In this way, the magnetic yoke provided at each coil may have various shapes such that the magnetic yokes are pulled to the magnet array when the motor is stopped, and as a result the center of each permanent magnet stops at a position displaced from the center of each electromagnetic coil (specifically, the center of the core member).

B. Configuration of Drive Control Circuit

Figure 9A:
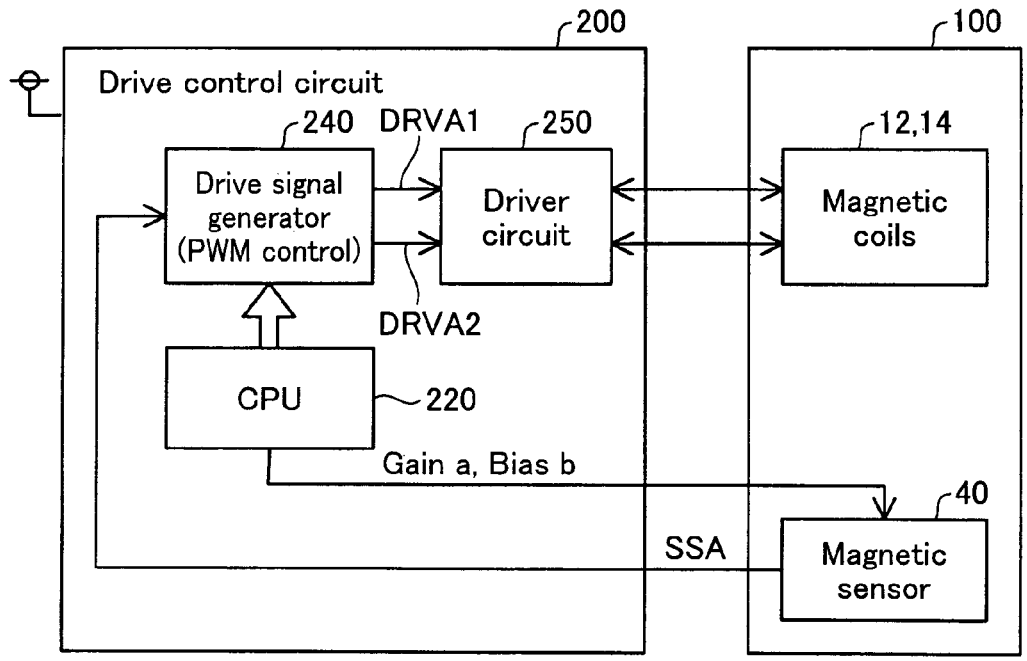
FIGS. 9A and 9B are block diagrams depicting configurations of a drive control circuit of the motor of the embodiment.

FIG. 9A is a block diagram depicting a configuration of a drive control circuit of the brushless motor of the present embodiment. The drive control circuit 200 has a CPU 220, a drive signal generator 240, and a driver circuit 250. The drive signal generator 240 generates a single-phase drive signal DRVA1, DRVA2 on the basis of the output signal SSA of the magnetic sensor 40 in the motor unit 100. The driver circuit 250 drives the magnetic coils 11-14 in the motor unit 100, in accordance with the single-phase drive signal DRVA1, DRVA2. The CPU 220 may be omitted. Where the CPU 220 is omitted, the functions performed by the CPU 220 described in this embodiment will be accomplished by another circuit (e.g. a logic circuit or nonvolatile memory). Alternatively, the CPU 220 may be substituted by a communications circuit or interface circuit, which will receive various operating instructions from an external device, and transfer the instructions to circuit elements within the drive control circuit 200.

Figure 9B:
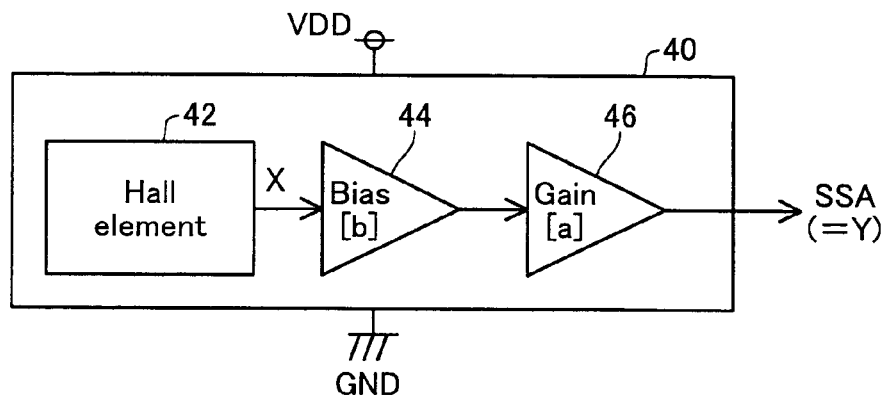

FIG. 9B shows an exemplary internal configuration of the magnetic sensor 40. The magnetic sensor 40 has a Hall element 42, a bias adjuster 44, and a gain adjuster 46. The Hall element 42 measures magnetic flux density X. The bias adjuster 44 adds a bias value b to the output X of the Hall element 42; the gain adjuster 46 performs multiplication by a gain value a. The output SSA (=Y) of the magnetic sensor 40 is given by Expression (1) or Expression (2) below.

$$Y = a \cdot X + b \quad (1)$$

$$Y = a(X + b) \quad (2)$$

The gain value a and the bias value b of the magnetic sensor 40 are set internally in the magnetic sensor 40 by the CPU 220. By setting the gain value a and the bias value b to appropriate values, it is possible to correct the sensor output SSA to a desirable waveform shape.

Figure 10:
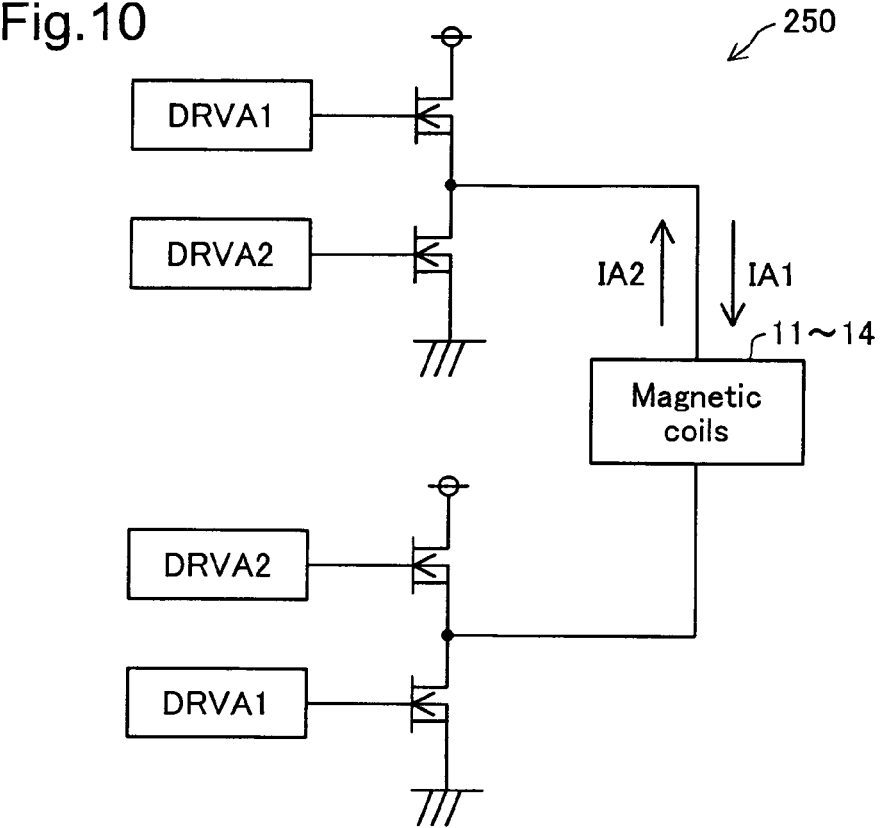
FIG. 10 is a diagram depicting the internal configuration of a driver circuit.

FIG. 10 is a diagram depicting the internal configuration of the driver circuit 250. This driver circuit 250 is an H bridge circuit which drives the coils 11-14 according to the AC single-phase drive signals DRVA1, DRVA2. The arrows labeled IA1, IA2 respectively indicate the direction of current flow by the single-phase drive signals DRVA1, DRVA2.

Figure 11A:
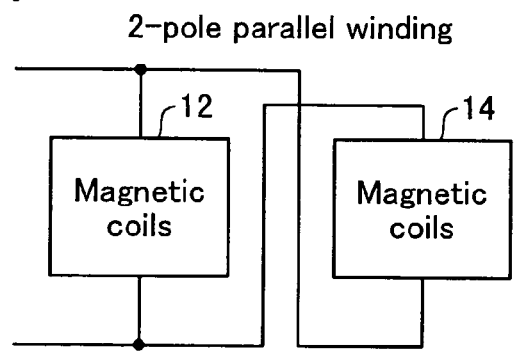
FIGS. 11A and 11B are illustrations of various coil winding configurations.
Figure 11B:
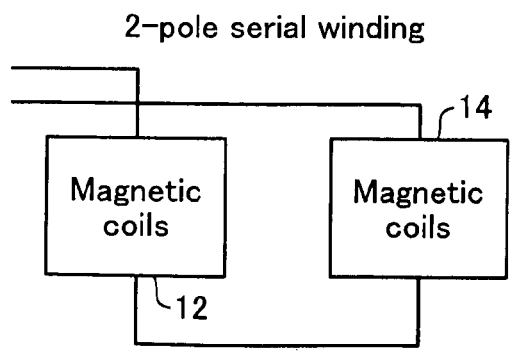

FIGS. 11A and 11B are illustrations of various winding configurations for the magnetic coils 12, 14. In these examples, the magnetic coils 12, 14 are wound such that they are always excited in the same direction.

FIGS. 12A to 12E illustrate internal configuration and operation of the drive signal generator 240 (FIG. 9A). The drive signal generator 240 has a basic clock generating circuit 510, a 1/N frequency divider, a PWM unit 530, a moving direction register 540, a multiplier 550, an encoder unit 560, an AD converter 570, a voltage control value register 580, and an excitation interval setting unit 590.

The basic clock generating circuit 510 generates a clock signal PCL of prescribed frequency, and includes a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 220. The PWM unit 530 generates the AC single-phase drive signals DRVA1, DRVA2 (FIG. 9A) based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setting unit 590. This operation will be discussed later.

A value RI indicating the direction for motor rotation is established in the moving direction register 540, by the CPU 220. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the π phase point of the output waveform, or the point at which the sine wave passes through the origin. The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the π phase point of the sensor waveform.

The encoder unit 560 converts the range of the sensor output value subsequent to AD conversion, and sets the value of the π phase point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder unit 560 and conversion to an integer; the multiplication value Ma thereof is supplied to the PWM unit 530.

FIGS. 12B to 12E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 12B to 12E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is positive; in FIGS. 12B to 12E, both are shown together. For convenience, the second drive signal DRVA2 is shown in the form of pulses on the negative side.

FIGS. 13A to 13C depict correspondence between sensor output waveform and waveform of the drive signals generated by the PWM unit 530. In the drawing, "Hiz" denotes a state of high impedance where the magnetic coils are not excited. As described in FIGS. 12B to 12E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA, SSB.

The PWM unit 530 is constructed such that drive signals are output only during the excitation intervals indicated by the excitation interval signal Ea supplied by the excitation interval setting unit 590, with no drive signals being output at intervals except for the excitation intervals (non-excitation intervals). FIG. 13C depicts drive signal waveforms produced in the case where excitation intervals EP and non-excitation intervals NEP have been established by the excitation interval signal Ea. During the excitation intervals EP, the drive signal pulses of FIG. 13B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the $\pi/2$ phase point, where the position in the back electromotive force waveform (induced voltage waveform) at which polarity reverses is denoted as the $\pi$ phase point; and preferably the non-excitation intervals NEP will be established in intervals symmetric about the $\pi$ phase point of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be understood from the preceding description, with the motor of the present embodiment, it is possible to adjust the application voltage using both the voltage control value Ya and the excitation interval signal Ea. In preferred practice, relationships between desired application voltage on the one hand, and the voltage control value Ya and excitation interval signal Ea on the other, will be stored in advance in table format in memory in the drive control circuit 200 (FIG. 8A). By so doing, when the drive control circuit 200 has received a target value for the desired application voltage from the outside, it will be possible for the CPU 220, in response to the target value, to set the voltage control value Ya and the excitation interval signal Ea in the drive signal generator 240. Adjustment of application voltage does not require the use of both the voltage control value Ya and the excitation interval signal Ea, and it would be acceptable to use either one of them instead.

Figure 14:
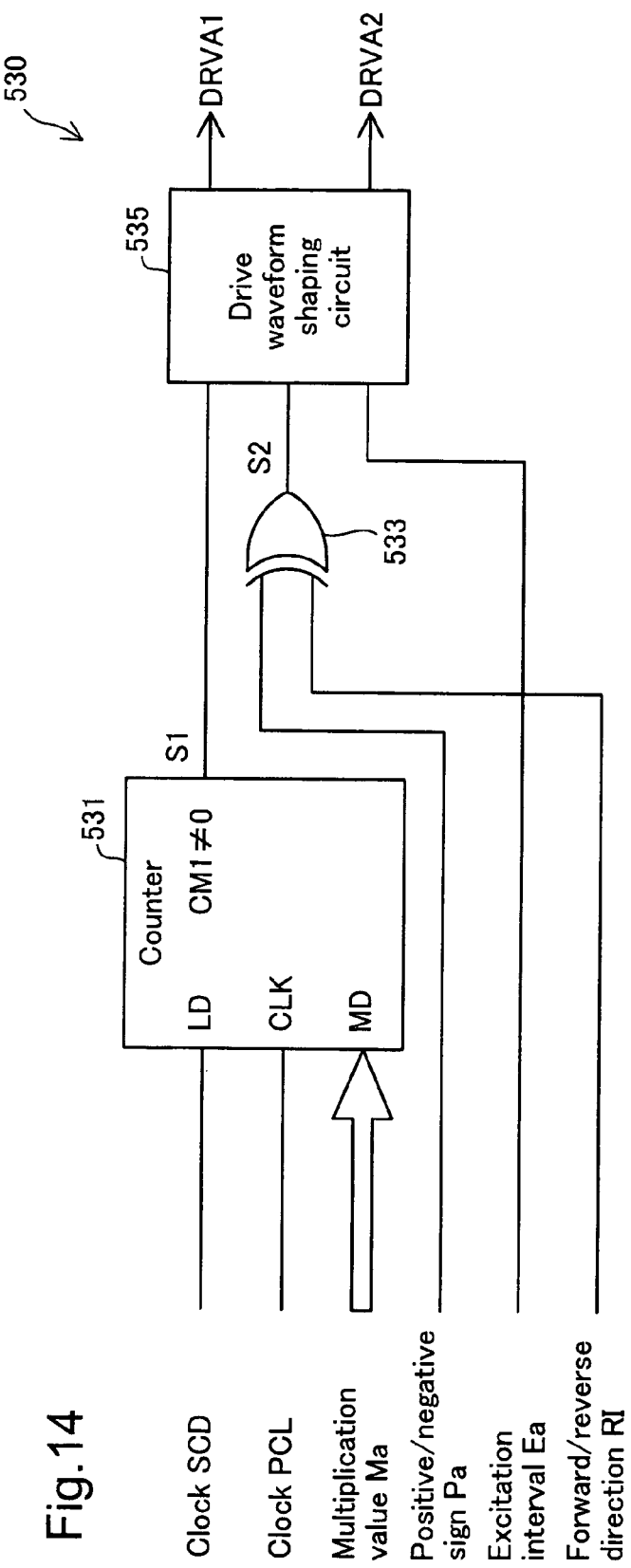
FIG. 14 is a block diagram depicting the internal configuration of a PWM unit.

FIG. 14 is a block diagram depicting the internal configuration of the PWM unit 530 (FIG. 12A). The PWM unit 530 has a counter 531, an EXOR circuit 533, and a drive waveform shaping circuit 535. Their operation will be described below.

FIG. 15 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 15, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 15, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

FIG. 16 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 15, and it will be appreciated that the motor runs in reverse as a result.

Figure 17A:
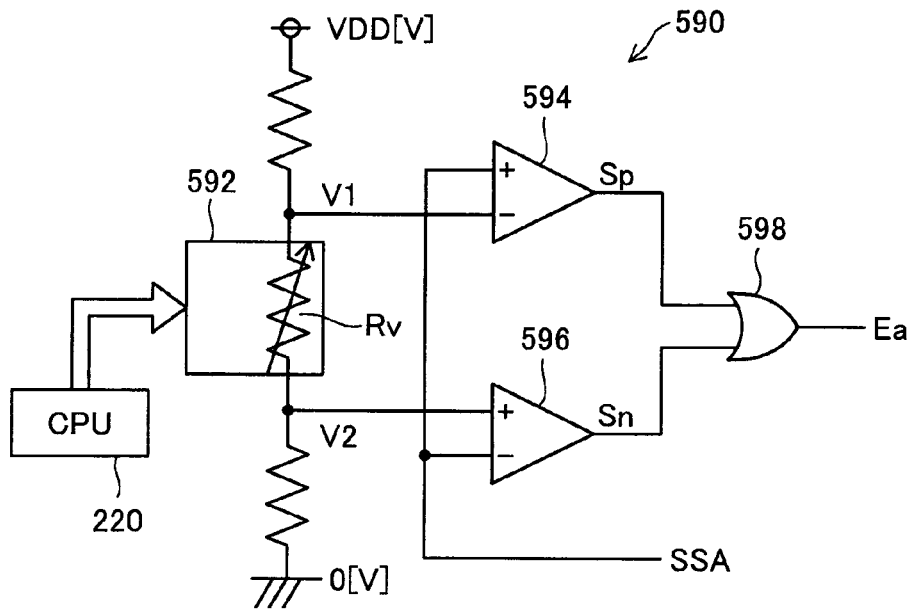
FIGS. 17A and 17B illustrate the internal configuration and operation of an excitation interval setting unit.
Figure 17B:
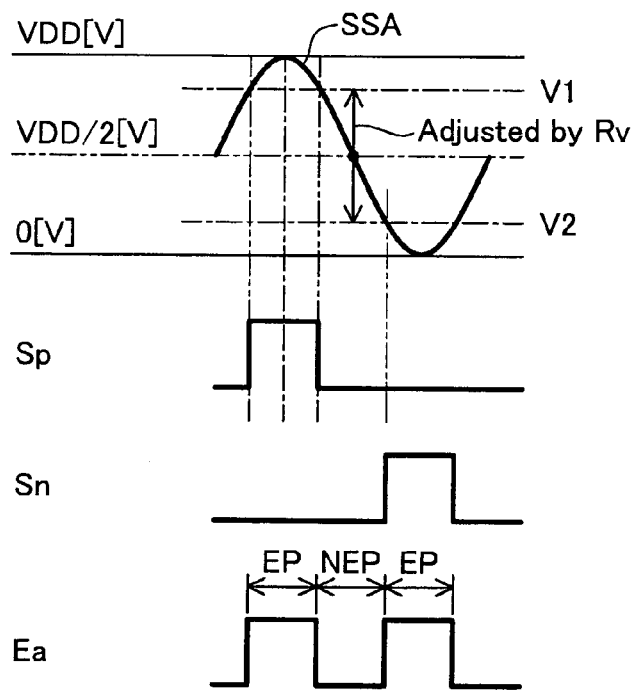

FIGS. 17A and 17B illustrate the internal configuration and operation of an excitation interval setting unit 590. The excitation interval setting unit 590 has an electronic variable resistor 592, a voltage comparators 594, 596, and an OR circuit 598. The resistance Rv of the electronic variable resistor 592 is set by the CPU 220. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 17B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 17B, the excitation interval signal Ea can be used as a signal indicating excitation intervals EP and non-excitation intervals NEP. The excitation intervals EP and non-excitation intervals NEP are established by the CPU 220, by adjusting the variable resistance Rv.

Figure 18A:
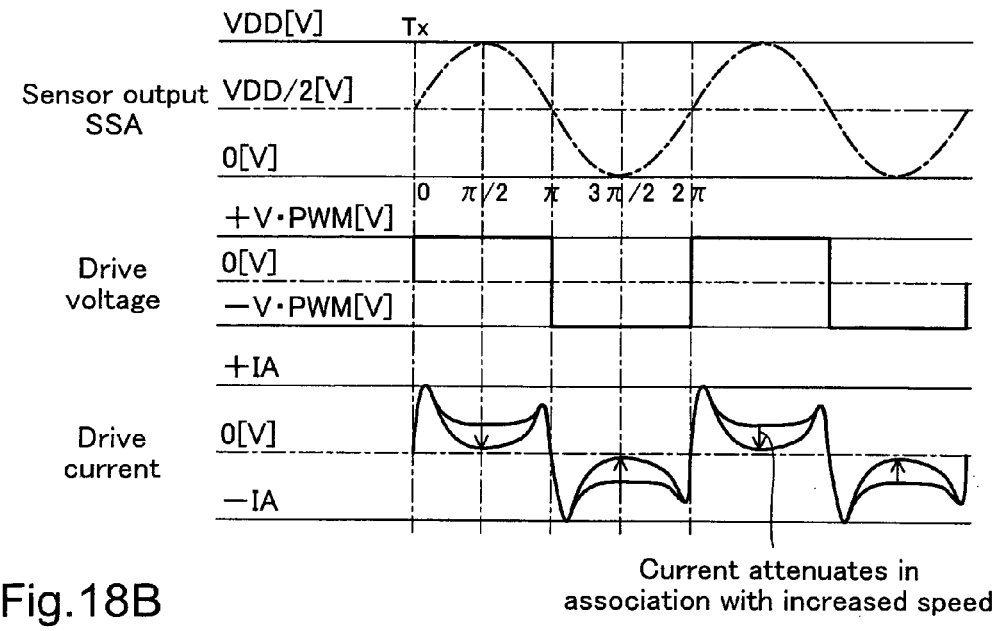
FIGS. 18A and 18B are illustrations comparing various signal waveforms in the case where the motor of Embodiment is driven by a rectangular wave, and where driven by a sine wave.
Figure 18B:
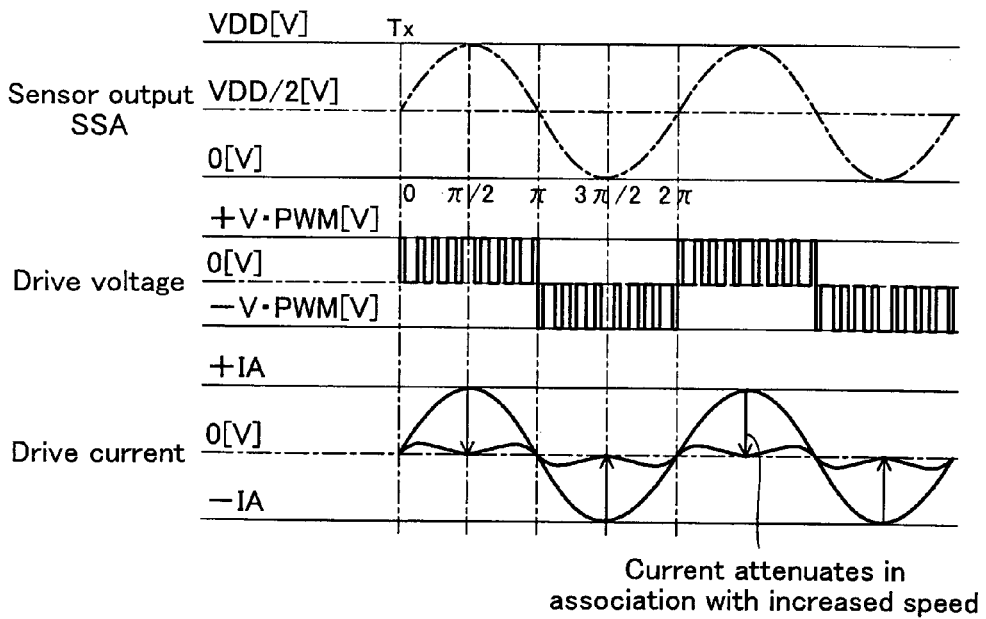

FIGS. 18A and 18B are illustrations comparing various signal waveforms in the case where the motor of the embodiment discussed above is driven by a rectangular wave, and where driven by a sine wave. Where a rectangular wave is employed for driving, a drive voltage of rectangular wave shape is applied to the coils. While the drive current is close to a rectangular wave at startup, it decreases as rotation speed increases. This is because the back electromotive force increases in response to the increased rotation speed (FIG. 2B). With a rectangular wave, however, despite increased rotation speed the current value will not decline appreciably in proximity to the timing of switching of the drive voltage at phase=n$\pi$, so a fairly large current will tend to flow.

On the other hand, where a sine wave is employed for driving, PWM control is employed for the drive voltage so that the effective values of the drive voltage have sine wave shape. While the drive current is close to a sine wave at startup, as rotation speed increases the drive current will decrease due to the effects of back electromotive force. With sine wave driving, the current value declines appreciably in proximity to the timing of switching of the drive voltage polarity at phase=nπ. As discussed in the context of FIGS. 2A to 2C, generally speaking the energy conversion efficiency of a motor is low in proximity to the timing of switching of the drive voltage polarity. With sine wave driving, the current value during intervals of low efficiency is lower than with rectangular wave, making it possible to drive the motor more efficiently.

FIGS. 19A and 19B are illustrations comparing wire connections and operation of a conventional 2-phase motor and the single-phase motor of an embodiment of the invention. As shown in FIG. 19A, with a conventional 2-phase motor, either the Phase A coil CLa or the Phase B coil CLb, but not both, are driven at any one time; the coils CLa, CLb are never driven simultaneously. With the single-phase motor of the present embodiment on the other hand, the two Phase A coils CLa are excited simultaneously, as shown in FIG. 19B. As a result, it is possible to obtain a motor having better efficiency than a conventional 2-phase motor. With the single-phase motor of the embodiment, utilizing PWM control to generate a drive signal having effective voltage similar to the back electromotive force generated by the coils in the motor, the coils are driven by this drive signal, thus further improving efficiency. An advantage of using a drive signal having effective voltage similar to the back electromotive force generated by the coils in the motor is that the noise and vibration of the motor are reduced considerably.

Figure 20A:
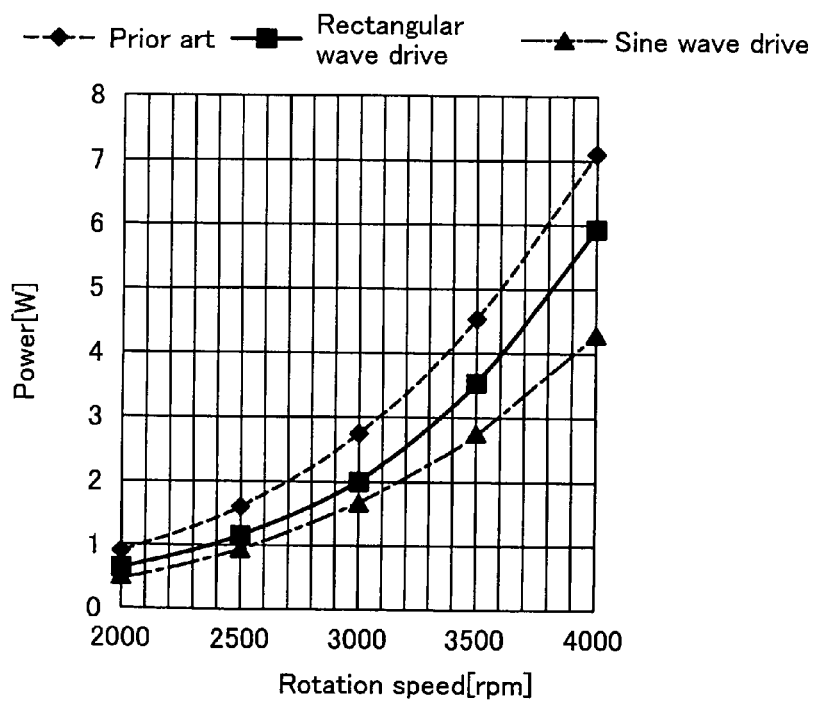

FIG. 20 compares the characteristics of the prior art two-phase motor and the single-phase motor of the embodiment. With these measurements, the same load (fan blades) were used with the two-phase motor and the one-phase motor. With the two-phase motor, measurement was performed with a rectangular wave drive such as that shown in FIG. 19A. With the one-phase motor, measurement was performed with both rectangular wave drive and sine wave drive.

From the table of FIG. 20, we can understand the following items.

(1) Effect of Single-Phase Motor:

Compared to a case of a rectangular wave drive, the power consumption of the single-phase motor of the embodiment was improved from the power consumption of the conventional two-phase motor by approximately 38% (at rotation speed 1800 rpm) to approximately 17% (at rotation speed 4000 rpm).

(2) Effect with Sine Wave Drive:

The power consumption of the single-phase motor of the embodiment with the sine wave drive was improved from the power consumption with the square wave drive by approximately 17% (at rotation speed 1800 rpm) to approximately 28% (at rotation speed 4000 rpm).

(3) Overall Effect:

The power consumption of the single-phase motor of the embodiment with the sine wave drive was improved from the power consumption of the conventional two-phase motor with the rectangular wave drive by approximately 49% (at rotation speed 1800) to approximately 40% (at rotation speed 4000 rpm).

Note that the conventional two-phase fan motor is used for many electronic devices as the drive mechanism of the world's leading fan motors, but with the single-phase motor of this embodiment, it is possible to improved this power energy by approximately 40% to approximately 50%. Therefore, we can understand that the motor of this embodiment of the invention is an effective technology even on a worldwide scale, and is excellent technology for sufficiently dealing with environmental problems.

C. Other Embodiments of the Motor Constitution

FIGS. 21A-22B and FIGS. 22A-22B are cross section diagrams showing examples of other constitutions of the motor main unit. Note that in these drawings, the same code number is given to parts corresponding to the parts of the motor main unit 100 of FIGS. 1A-1B.

Figure 21B:
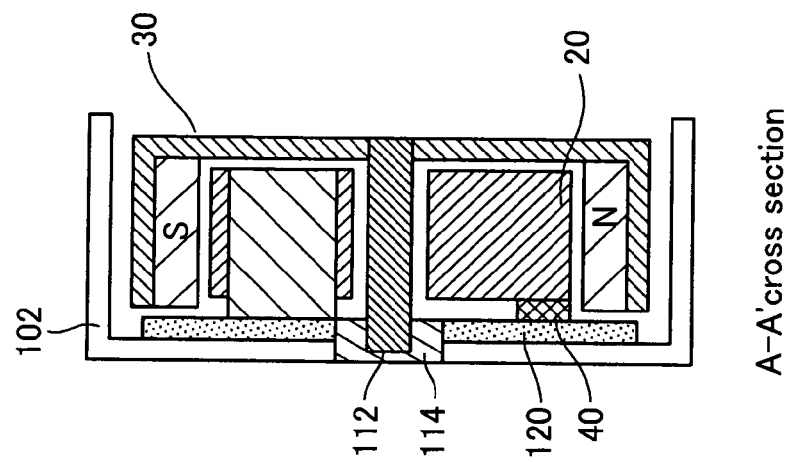
FIGS. 21A and 21B are cross section diagrams showing another constitution of the motor main unit.
Figure 21A:
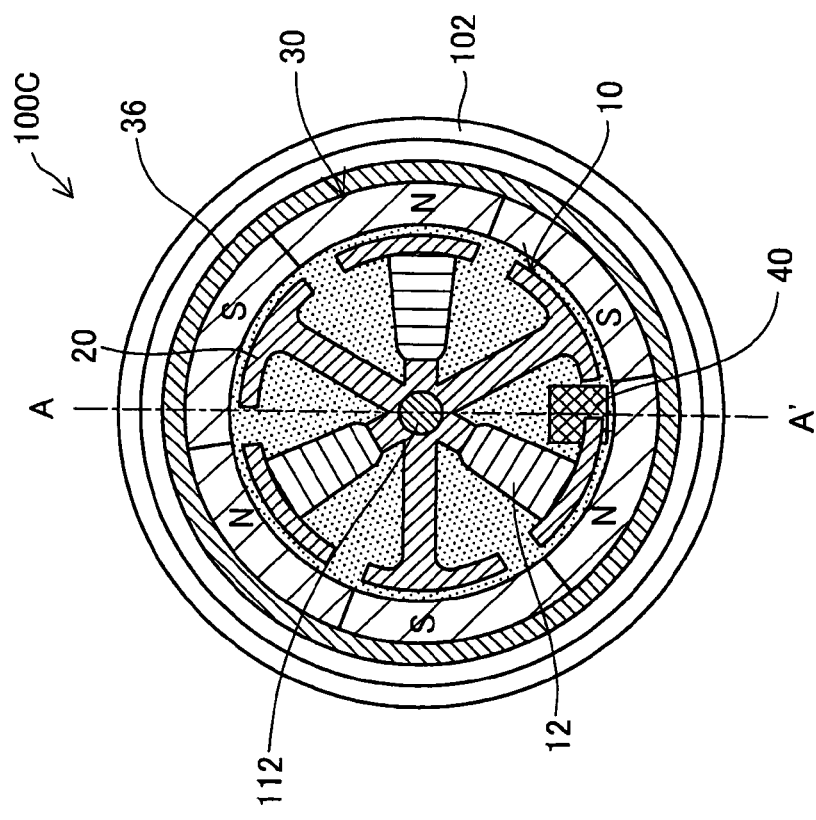

With the motor main unit 100c of FIGS. 21A-21B, the magnetic yokes and magnets of the motor main unit 100 shown in FIGS. 1A-1B are respectively increased to six, and the electromagnetic coils are increased to three, and the rest of the constitution is almost the same as that of FIGS. 1A-1B. The electromagnetic coil 12 is coiled at a ratio of 1 to 2 in relation to the six magnetic yokes 20. With the motor main unit 100c of FIGS. 21A-21B, the rotor unit 30 rotates 120 degrees for an electrical angle of 2π. Note that the pole number of the permanent magnets may be selected arbitrarily. For example, the same as with the 6-pole single-phase motor shown in FIGS. 21A-21B, it is possible to constitute an 8-pole single-phase motor.

Note that during the reverse drive described with FIGS. 6A-6E, reverse rotation occurs after initial forward rotation of a specified amount (in the case of FIG. 6A, with the electrical angle of approximately π/2), and it is preferable to have the rotation angle of the rotor unit 30 during the initial forward rotation be as small as possible. In this sense, the 6-pole motor of FIGS. 21A-21B is more preferable than the 4-pole motor of FIGS. 1A-1B.

Figures 22A, 22B:
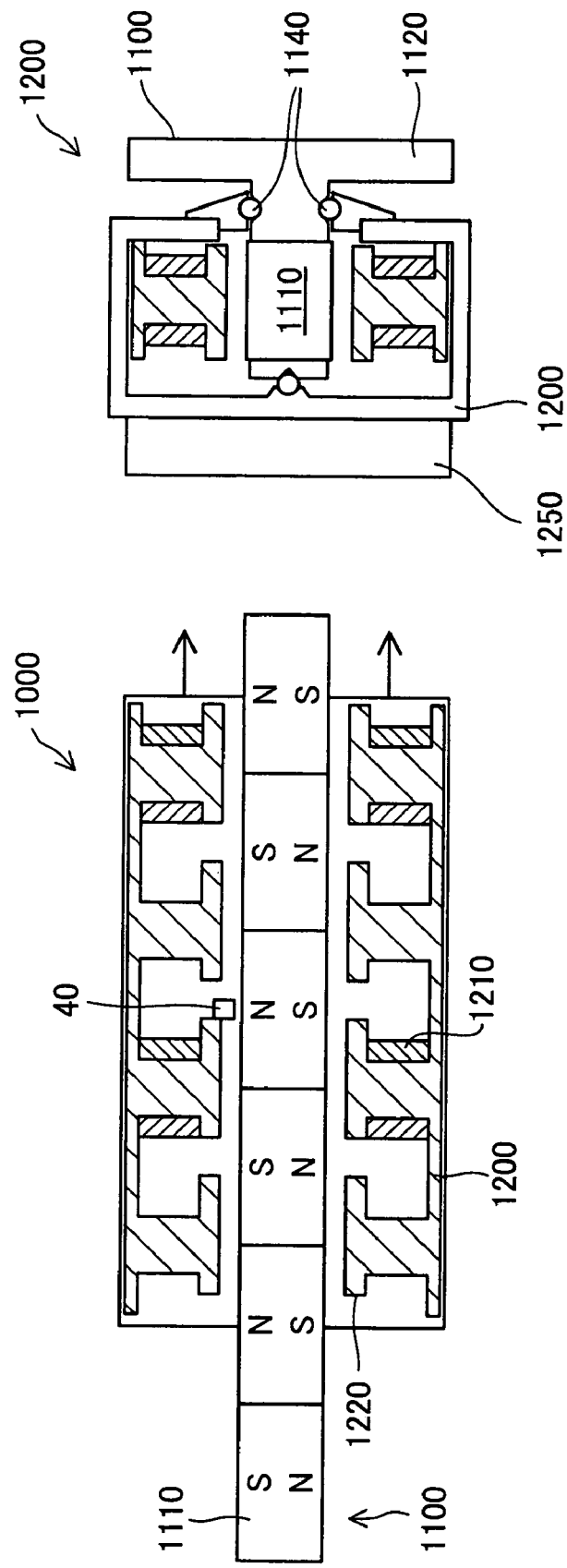
FIGS. 22A and 22B are cross section diagrams showing another constitution of the motor main unit.

FIGS. 22A-22B show the constitution of a linear motor as another embodiment of this invention. This linear motor 1000 is equipped with a fixed guide unit 1100 and a moving unit 1200. On the fixed guide unit 1100, there are aligned a large number of permanent magnets 1110 along the movement direction. The moving unit 1200 is constituted so as to sandwich the fixed guide unit 1100 in the vertical direction, and the plurality of electromagnetic coils 1210 are provided respectively facing the top and bottom of the magnet array. The electromagnetic coils 1210 are coiled at a ratio of 1 to 2 in relation to the plurality of magnetic yokes 1220. Also, the magnetic sensor 40 is provided between the magnetic yokes 1220. As shown in FIG. 22B, a drive control unit 1250 is provided on the moving unit 1200. The drive control unit 1250 has an independent power supply device (not illustrated) such as a fuel cell or the like. The fixed guide unit 1100 has a rail 1120 to guide the moving part 1200. The moving part 1200 is held to be able to slide on the rail 1120 by a bearing unit 1140. The embodiment of this invention may also be realized as this kind of linear motor.

With the example in FIGS. 22A-22B, the first member having the electromagnetic coils is moving, and the second member having the permanent magnets is fixed. This relationship is the reverse of the constitution of the motor shown in FIGS. 21A-21B. Specifically, with the motor shown in FIGS. 1A-1B, the first member having the electromagnetic coils (stator unit 10) is fixed, and the second member having the permanent magnets (rotor unit 30) is moving. As can be understood from these examples, the motor according to the embodiment of this invention is equipped with the first member having electromagnetic (also called the "first drive member") and the second member having permanent magnets (also called the "second drive member"), and this configuration can be realized as various types of motors constituted so that the two members can be moved relative to each other.

Note that with the single-phase brushless motors shown in FIGS. 21A-21B and FIGS. 22A-22B include magnetic yokes (magnetic body members) which are constituted so as to cause the motor to stop at a position where the permanent magnet and the electromagnetic coil center (specifically, the core member center) are slightly displaced when stopped. Therefore, the deadlock point is not generated, and it is possible to start up the single-phase brushless motor without providing a startup coil. Also, when one wishes to operate the motor in the reverse direction, it is possible to reliably operate in the reverse direction by switching the polarity of the drive signals after initially driving the motor in the forward direction by a specified amount from a stopped state.

FIG. 23A is an explanatory drawing showing the constitution of the three-phase brushless motor for another embodiment of the invention. A plurality of magnets are aligned on the rotor unit 30. A large number of magnetic yokes 20 including the core member 22e and the plate shaped member 21e are provided on the stator unit 10. Three magnetic yokes 20e constitutes one magnetic yoke group 20f, and plural yoke groups 20f are arranged with a pitch correlating to the magnetic pitch Pm (which is an interval between N pole and S pole). In other words, the pitch between the magnetic yoke groups 20f is equal to the magnetic pole pitch Pm. The A phase coil 11, B phase coil 12, and C phase coil 13 are coiled in this sequence on the three magnetic yokes 20e at the left side of FIG. 23A. Coils are not coiled on the next three magnetic yokes 20e, and furthermore, the coils 11 to 13 are coiled on the next three magnetic yokes 20e. In this way, with the three-phase motor, electromagnetic coils are coiled only at a ratio of 1 to 2 for the magnetic yokes 20e (to be precise, the core member 22e). With this kind of constitution as well, it is possible to achieve sufficiently high efficiency the same as with the single-phase motor shown in FIGS. 1A-1B. FIG. 23B shows another configuration where the position of the B phase coils 2 is moved from FIG. 23A. With this configuration, a coil is coiled on the magnetic yokes regularly selected at a ratio of 1 to 2 in relation to magnetic yokes allocated to each phase of A, B, and C, and the coils are also coiled on magnetic yokes regularly selected at a ratio of 1 to 2 in relation to all the magnetic yokes. With the constitution in FIG. 23B, there is the advantage that the weight balance is even better than the constitution of FIG. 23A.

Note that with the examples in FIGS. 23A-23B, the magnetic yoke 20e has an laterally even shape, so at the motor stop position, the core member 22e directly faces the magnets. The reason for this is that since this motor is a three-phase motor, there is no possibility of a deadlock point being generated. Therefore, it is possible to omit the plate shaped member 21e, and it is possible for the magnetic yoke 20e to have only the core member 22e.

As can be understood from the various embodiments described above, the coiling of electromagnetic coils only on a core member regularly selected at a ratio of 1 to 2 is not limited to a single-phase motor, but may also be applied to motors of any number of phases M where M is an integer of 1 or greater. Also, the number of electromagnetic coils for each phase may be any number N where N is an integer of 1 or greater. However, it is preferable to have N be 2 or greater. Also, typically, it is preferable that each phase electromagnetic coil be coiled on the regularly selected core member at a ratio of 1 to 2M from among the array of 2 (M×N) core members (also called the "magnetic body core"). By doing this, while keeping the weight balance, it is possible to generate quite a large magnetic flux on the core members for which coils are not coiled as well.

D. MODIFICATION EXAMPLES

The present invention is not limited to the embodiments described hereinabove, and may be reduced to practice in various other ways without departing from the spirit thereof. Modifications such as the following would be possible, for example.

D1. Modification Example 1

While analog magnetic sensors are employed in the preceding embodiments, it is possible to use digital magnetic sensors having multivalue analog output, instead of analog magnetic sensors. Both an analog magnetic sensor and a digital magnetic sensor with multivalue analog output will have an output signal exhibiting analog variation. Herein, an "output signal exhibiting analog variation" refers in the broad sense to include both analog output signals, and multilevel digital output signals having three or more levels, not On/Off binary output.

It is also acceptable to use a digital magnetic sensor with binary digital output, instead of a sensor with an output signal exhibiting analog variation. In this case, the ADC 570 and the excitation interval setting unit 590 of FIG. 12A will not be necessary. Consequently, while the failure to set the excitation interval and to use a sine wave drive waveform will result in lower efficiency and the occurrence of noise/vibration, it will be possible to realize the drive control circuit by an inexpensive IC.

D2. Modification Example 2

It is possible to employ as the PWM circuit various circuit configurations besides that shown in FIG. 12A For example, it is possible to use a circuit that performs PWM control by comparing a sensor output with a triangular reference wave. It is also possible to employ a circuit that generates drive signals by some method besides PWM control. For example, a circuit that amplifies sensor output and generates an analog drive signal may be used.

In FIG. 12A, the ADC 570 may be replaced with a voltage comparator. In this case, the drive waveform will be rectangular rather than a sine wave drive waveform, and thus noise/vibration will occur, but it will be possible to realize the drive control circuit by an inexpensive IC.

D3. Modification Example 3

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 24:
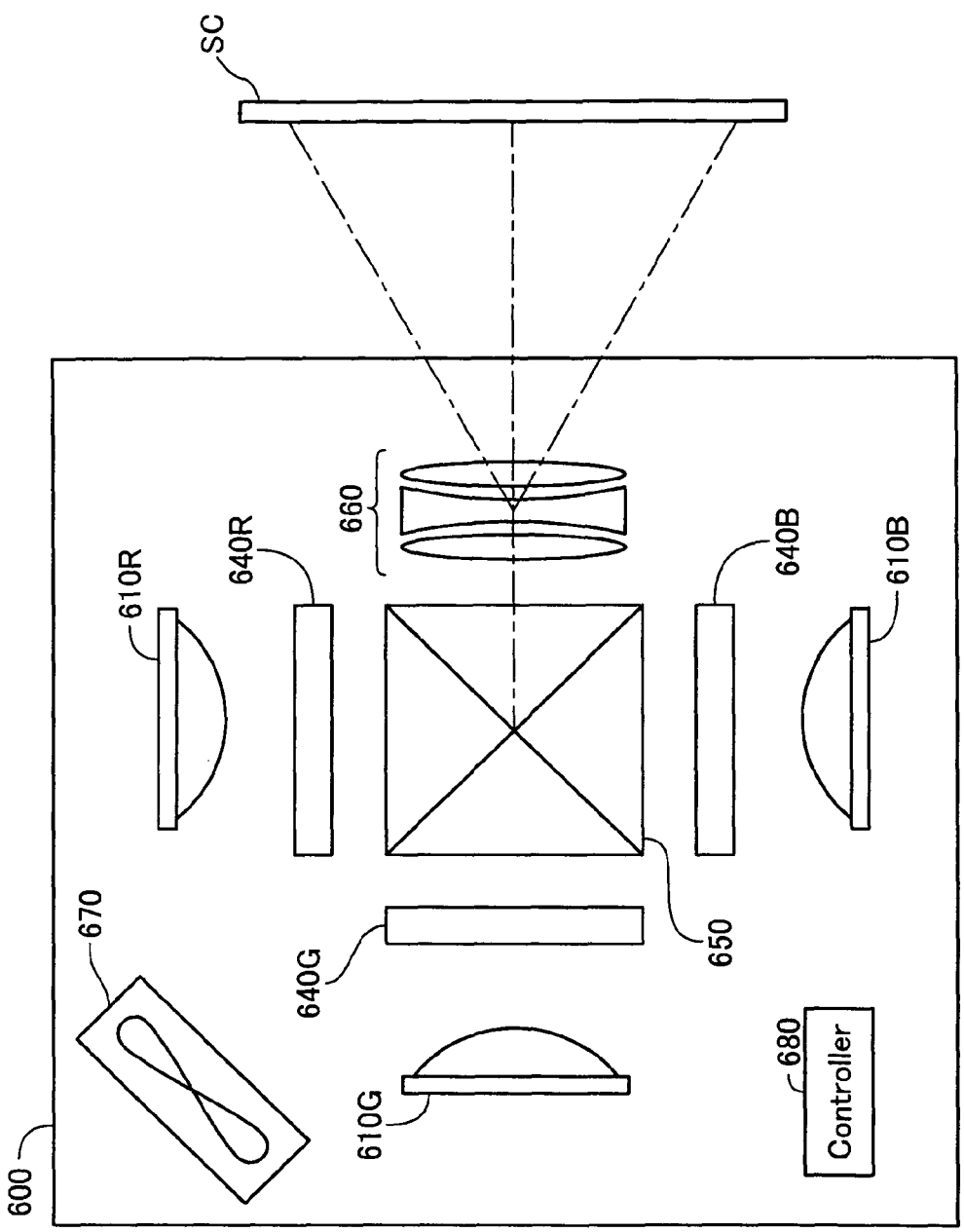
FIG. 24 illustrates a projector that utilizes a motor according to the embodiment of the present invention.

FIG. 24 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 25A:
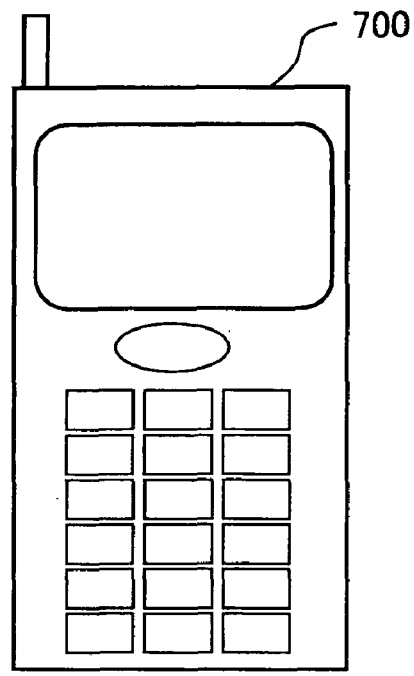
FIGS. 25A to 25C illustrate a fuel cell type mobile phone that utilizes a motor according to the embodiment of the present invention.
Figure 25B:
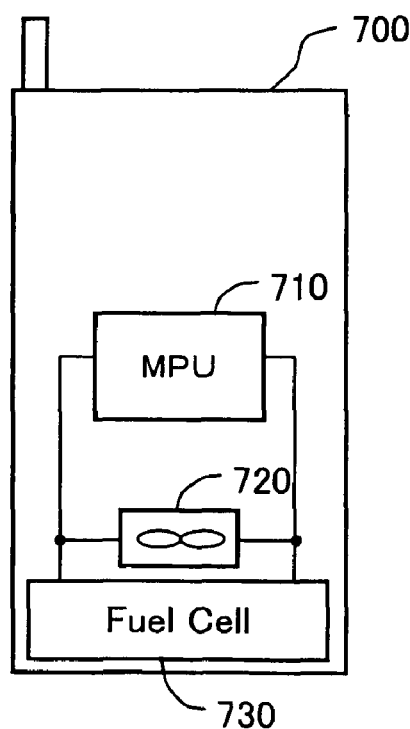
Figure 25C:
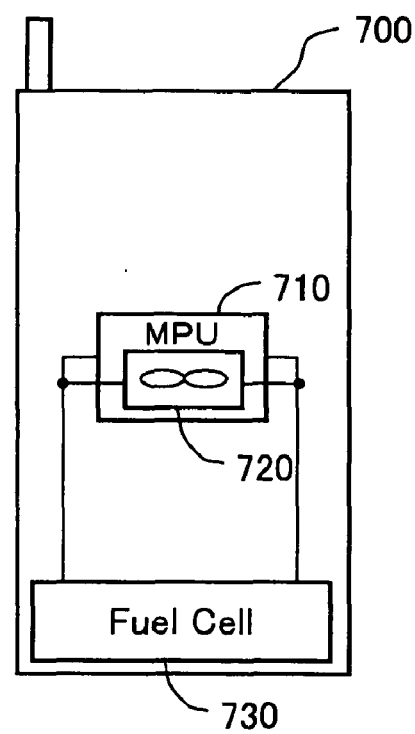

FIGS. 25A to 25C illustrate a mobile phone utilizing a motor according to the present invention. FIG. 25A shows the external view of a mobile phone 700, and FIG. 25B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 25C, to cool the MPU 710. Various rotation type brushless motors described above can be used as the motor for driving the fan 720.

Figure 26:
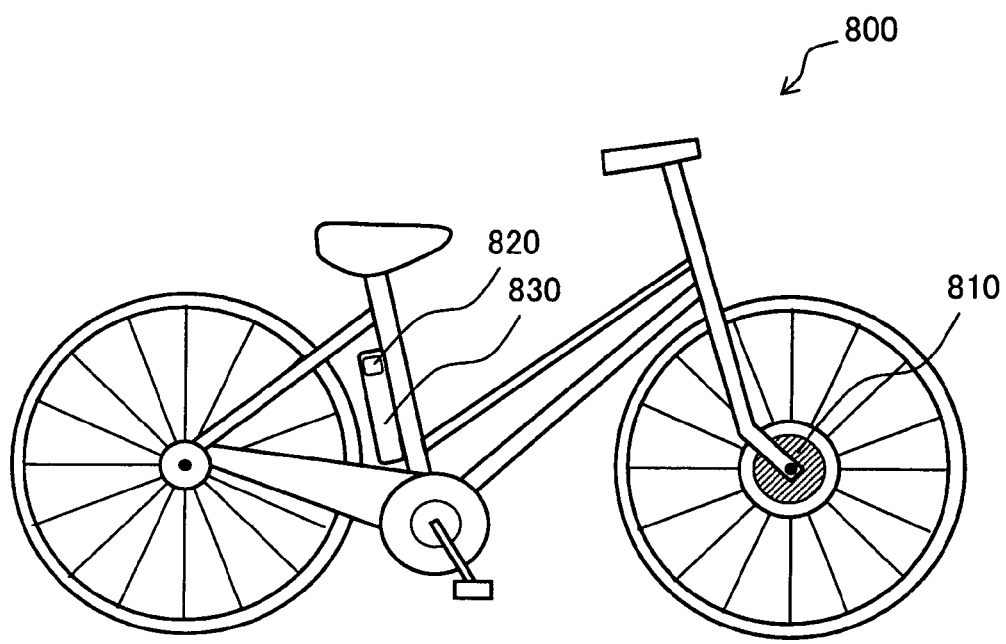
FIG. 26 illustrates an electrically powered bicycle (electric power assisted bicycle) as an example of a moving body utilizing motor/generator according to the embodiment of the present invention.

FIG. 26 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 27:
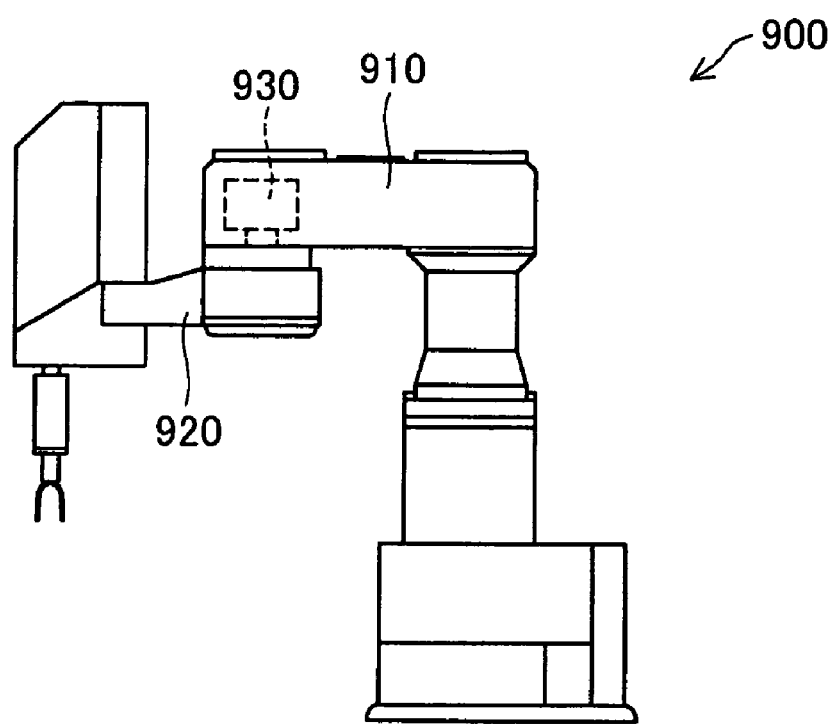
FIG. 27 illustrates an example of a robot that utilizes a motor according to the embodiment of the present invention.

FIG. 27 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A brushless DC motor, comprising:
   a first drive member including M phase coil groups, each phase having N electromagnetic coils where M is equal to three and N is an integer of 2 or greater;
   a second drive member including a plurality of permanent magnets, the second drive member being movable relative to the first drive member;
   a magnetic sensor disposed on the first drive member, the magnetic sensor detecting a relative position of the magnets and the coils; and
   a drive control circuit generating an application voltage to drive the coils based on an output signal of the magnetic sensor,
   wherein the first drive member has 2(M×N) spaced apart magnetic yokes, each magnetic yoke including:
   a magnetic body core, and
   a plate shaped member that is laterally unbalanced relative to a center of the magnetic body core,
   wherein all of the plate shaped members are laterally unbalanced in a common direction relative to the centers of the magnetic body cores,
   each phase electromagnetic coil is coiled on a magnetic yoke regularly selected at a ratio of 1 to 2 from among all the magnetic yokes,
   the magnetic sensor is disposed between the magnetic yokes and spaced apart from inner edges of the magnetic yokes, and
   the plate shaped member of the magnetic yoke of the first drive member provides stop position regulation by pulling the magnetic yoke to one of the permanent magnets when the brush less DC motor stops, so that a center of each permanent magnet stops at a position displaced from the center of each magnetic body core.

2. The brushless DC motor in accordance with claim 1, wherein
   at least part of each magnetic yoke is arranged between each electromagnetic coil and each permanent magnet when the brushless DC motor stops.

3. The brushless DC motor in accordance with claim 2, wherein
   each plate shaped member is formed monolithically with the magnetic body core.

4. The brushless DC motor in accordance with claim 1, wherein
   the magnetic sensor outputs the output signal indicating analog changes according to the relative position of the magnets and the coils.

5. The brushless DC motor in accordance with claim 4, wherein
   the drive control circuit includes a PWM control circuit for generating the drive signals by executing PWM control using the analog changes of the output signal of the magnetic sensor.

6. An apparatus, comprising:
   the brushless DC motor according to claim 1; and
   a driven member driven by the brushless DC motor.

7. A moving body comprising the brushless DC motor according to claim 1.

8. The brushless DC motor in accordance with claim 1, wherein
   the plate shaped member includes a notch formed therein, the notch being laterally offset relative to the center of the magnetic body core.

9. The brushless DC motor in accordance with claim 1, wherein
   the plate shaped member has a convex shape that is laterally offset relative to the center of the magnetic body core.

10. The brushless DC motor in accordance with claim 9, wherein
    the magnetic body core is laterally unbalanced.

11. The brushless DC motor in accordance with claim 1, wherein
    the magnetic body core is laterally unbalanced.

* * * * *